US010078258B2

(12) United States Patent
Okumura

(10) Patent No.: US 10,078,258 B2
(45) Date of Patent: Sep. 18, 2018

(54) PROJECTION DEVICE, PROJECTION DEVICE CONTROL METHOD, PROJECTION DEVICE CONTROL APPARATUS, AND COMPUTER PROGRAM THEREOF

(71) Applicant: NEC Corporation, Minato-ku, Tokyo (JP)

(72) Inventor: Fujio Okumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 404 days.

(21) Appl. No.: 14/912,201

(22) PCT Filed: Mar. 5, 2014

(86) PCT No.: PCT/JP2014/055569
§ 371 (c)(1),
(2) Date: Feb. 16, 2016

(87) PCT Pub. No.: WO2015/033598
PCT Pub. Date: Mar. 12, 2015

(65) Prior Publication Data
US 2016/0205363 A1 Jul. 14, 2016

(30) Foreign Application Priority Data

Sep. 4, 2013 (JP) ................................ 2013-182788

(51) Int. Cl.
*H04N 5/74* (2006.01)
*G03B 21/20* (2006.01)
*H04N 9/31* (2006.01)

(52) U.S. Cl.
CPC ..... *G03B 21/2053* (2013.01); *G03B 21/2033* (2013.01); *G03B 21/2086* (2013.01);
(Continued)

(58) Field of Classification Search
CPC ...... H04N 5/74; H04N 9/3155; H04N 9/3161; H04N 9/3194; G03B 21/2053; G03B 21/2033; G03B 21/2086
(Continued)

(56) References Cited

U.S. PATENT DOCUMENTS

2004/0150801 A1 8/2004 Kitada et al.
2004/0179191 A1* 9/2004 Kitabayashi ....... G01M 11/0242
356/124
(Continued)

FOREIGN PATENT DOCUMENTS

JP 2004-173232 A 6/2004
JP 2005-283658 A 10/2005
(Continued)

OTHER PUBLICATIONS

International Search Report for PCT Application No. PCT/JP2014/055569, dated Jun. 3, 2014.
(Continued)

*Primary Examiner* — Michael Lee

(57) ABSTRACT

A laser light source (110) emits a light that is a laser light. A projection control unit (120) controls, on the basis of image information, the intensity distribution of a light to be projected, thereby generating an image. A projection unit (130) projects the light as controlled by the projection control unit (120). A measurement unit (140) measures the intensity of the light projected from the projection unit (130). A distribution calculation unit (150) calculates, on the basis of the image information, the intensity distribution of the light to be projected from the projection unit (130). A selection unit (160) selects that partial evaluation area of the image which is to be used for determination. A determination unit (170) determines, on the basis of both the light intensity distribution, in the evaluation area, calculated by the distribution calculation unit (150) and the light intensity,
(Continued)

in the evaluation area, measured by the measurement unit (140), whether any abnormal projection has occurred. An output control unit (180) controls, on the basis of a determination result of the determination unit (170), either the laser light source (110) or the projection control unit (120).

19 Claims, 13 Drawing Sheets

(52) U.S. Cl.
CPC ............. *H04N 5/74* (2013.01); *H04N 9/3155* (2013.01); *H04N 9/3161* (2013.01); *H04N 9/3194* (2013.01)

(58) Field of Classification Search
USPC ........................................................ 348/177
See application file for complete search history.

(56) References Cited

U.S. PATENT DOCUMENTS

| | | | |
|---|---|---|---|
| 2005/0105057 A1* | 5/2005 | Matsuda | H04N 5/74 353/70 |
| 2005/0168705 A1* | 8/2005 | Li | H04N 5/74 353/69 |
| 2007/0046901 A1* | 3/2007 | Kuno | G03B 21/14 353/69 |
| 2009/0107359 A1* | 4/2009 | Rogojina | C09D 11/326 106/31.92 |
| 2010/0201894 A1* | 8/2010 | Nakayama | G09G 3/3433 348/745 |
| 2011/0018897 A1* | 1/2011 | Uchiyama | H04N 9/3176 345/619 |
| 2012/0327373 A1 | 12/2012 | Hosaka et al. | |
| 2013/0335642 A1 | 12/2013 | Fujioka | |
| 2014/0240808 A1* | 8/2014 | Yamamoto | G02B 26/101 359/198.1 |

FOREIGN PATENT DOCUMENTS

| | | |
|---|---|---|
| JP | 2010-044204 A | 2/2010 |
| JP | 2012-155227 A | 8/2012 |
| JP | 2013-003561 A | 1/2013 |
| WO | 2012/117548 A1 | 9/2013 |

OTHER PUBLICATIONS

English translation of Written opinion for PCT Application No. PCT/JP2014/055569.
Japanese Office Action for JP Application No. 2015-535330 dated Apr. 24, 2018 with English Translation.

* cited by examiner

US 10,078,258 B2

PROJECTION DEVICE, PROJECTION DEVICE CONTROL METHOD, PROJECTION DEVICE CONTROL APPARATUS, AND COMPUTER PROGRAM THEREOF

This application is a National Stage Entry of PCT/JP2014/055569 filed on Mar. 5, 2014, which claims priority from Japanese Patent Application 2013-182788 filed on Sep. 4, 2013, the contents of all of which are incorporated herein by reference, in their entirety.

TECHNICAL FIELD

The present invention relates to a projection device, a projection device control method, a projection device control apparatus, and a computer program thereof.

BACKGROUND ART

Image or picture projection devices have a plurality of systems. In a projection device using a phase modulation type spatial modulation element, which is one of them, a laser is used as a light source, and a laser light is diffracted on the basis of information of each pixel to form an image. Thus, a light can be concentrated on only a desired part, and an image or a picture can be projected brightly.

However, in such a system, since a laser is used as a light source, measures to ensure safety need to be implemented.

Patent Literature 1 (PTL1) states that a ratio of power of laser lights emitted from light sources of respective colors is obtained according to an image signal, and the laser lights emitted from the light sources are adjusted according to the obtained ratio such that a projection light does not exceed the upper limit of safety standards.

CITATION LIST

Patent Literature

[PTL1] International Publication WO2012/117548

SUMMARY OF INVENTION

Technical Problem

However, the present inventor thought that, by the method stated in Patent Literature 1 (PTL1), a laser light of unexpected intensity may be outputted due to a temperature change, a temporal change, and a defect of an element, and erroneous processing of a signal.

It is an object of the present invention to provide a projection device, a projection device control method, a projection device control apparatus, and a computer program thereof, which prevent a light of unexpected intensity from being projected.

Solution to Problem

According to the present invention,
a projection device including:
a laser light source that emits a light that is a laser light;
a projection control unit that controls, on the basis of image information, intensity distribution of the light to be projected, thereby generating an image;
a projection unit that projects the light controlled by the projection control unit;
a measurement unit that measures intensity of the light projected from the projection unit;
a distribution calculation unit that calculates, on the basis of the image information, intensity distribution of the light to be projected from the projection unit;
a selection unit that selects a partial evaluation area of the image which is to be used for determination;
a determination unit that determines, on the basis of both the light intensity distribution in the evaluation area, calculated by the distribution calculation unit and the light intensity in the evaluation area, measured by the measurement unit, whether abnormal projection has occurred; and
an output control unit that controls, on the basis of a determination result of the determination unit, either the laser light source or the projection control unit, is provided.

According to the present invention,
a projection device control method for controlling a projection device including a laser light source that emits a light that is a laser light, a projection control unit that controls, on the basis of image information, intensity distribution of the light to be projected, thereby generating an image, and a projection unit that projects the light controlled by the projection control unit, including:
calculating, on the basis of the image information, intensity distribution of the light to be projected from the projection device;
selecting a partial evaluation area of the image to be projected, which is to be used for determination;
measuring intensity of the light projected from the projection device;
determining, on the basis of both the calculated light intensity distribution, in the evaluation area, and the measured light intensity, in the evaluation area, whether abnormal projection has occurred; and
controlling, on the basis of a determination result, the intensity distribution of the light to be projected from the projection device, is provided.

According to the present invention,
a projection device control apparatus for controlling a projection device including a laser light source that emits a light that is a laser light, a projection control unit that controls, on the basis of image information, intensity distribution of the light to be projected, thereby generating an image, and a projection unit that projects the light controlled by the projection control unit, including:
a distribution calculation unit that calculates, on the basis of the image information of the image to be projected, intensity distribution of the light to be projected from the projection device;
a selection unit that selects a partial evaluation area of the image to be projected, which is to be used for determination;
a measurement unit that measures intensity of the light projected from the projection device;
a determination unit that determines, on the basis of both the light intensity distribution, in the evaluation area, calculated by the distribution calculation unit and the light intensity, in the evaluation area, measured by the measurement unit, whether abnormal projection has occurred; and
an output control unit that controls, on the basis of a determination result of the determination unit, the intensity distribution of the light to be projected from the projection device, is provided.

According to the present invention,
a computer program for achieving a projection device control apparatus including a laser light source that emits a light that is a laser light, a projection control unit that controls, on the basis of image information, intensity distribution of the light to be projected, thereby generating an image, a projection unit that projects the light controlled by the projection control unit, and a measurement unit that measures intensity of the projected light, which makes a computer function as:

a distribution calculation means that calculates, on the basis of the image information of the image to be projected, intensity distribution of the light to be projected from the projection device;

a selection means that selects a partial evaluation area of the image to be projected, which is to be used for determination;

a determination means that determines, on the basis of both the light intensity distribution, in the evaluation area, calculated by the distribution calculation unit and the measured light intensity, in the evaluation area, whether abnormal projection has occurred; and an output control means that controls, on the basis of a determination result of the determination means, the intensity distribution of the light to be projected from the projection device, is provided.

Advantageous Effects of Invention

According to the present invention, a projection device, a projection device control method, a projection device control apparatus, and a computer program thereof, which can detect abnormal output in which a light of unexpected intensity is projected and control intensity of a projection light, can be provided.

BRIEF DESCRIPTION OF DRAWINGS

The above-described object, other objects, features, and advantages will be further apparent from preferred exemplary embodiments described below and the accompanying drawings as follows.

DESCRIPTION OF EMBODIMENTS

Figure 1:
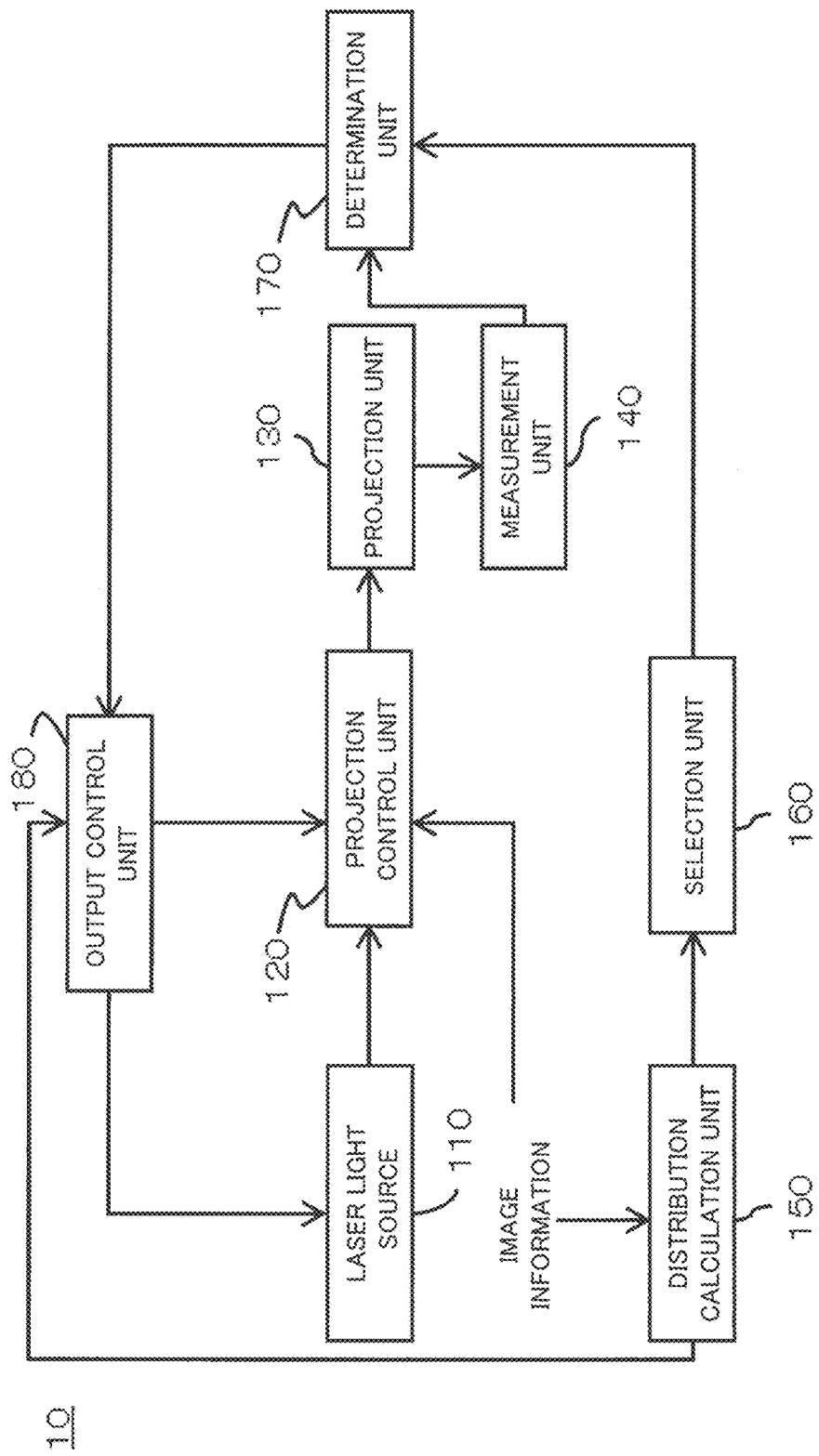
FIG. 1 is a diagram illustrating a configuration example of a projection device according to a first exemplary embodiment.

Hereinafter, exemplary embodiments of the present invention will be described using drawings. It is to be noted that, in all drawings, the same components are denoted by the same reference numerals, and the description is appropriately omitted.

It is to be noted that, in the following description, a distribution calculation unit 150, a selection unit 160, a determination unit 170, and an output control unit 180 indicate blocks of functional units rather than configurations of hardware units. The distribution calculation unit 150, the selection unit 160, the determination unit 170, and the output control unit 180 are achieved by an arbitrary combination of hardware and software focusing on a CPU, a memory, a program loaded on the memory, which achieves components of the present drawings, a storage media such as a hard disk, which stores the program, and an interface for network connection of an arbitrary computer. There are various modifications in the achievement method and devices thereof.

First Exemplary Embodiment

FIG. 1 is a diagram illustrating a configuration example of a projection device 10 according to a first exemplary embodiment.

According to the present exemplary embodiment, the projection device 10 includes a laser light source 110, a projection control unit 120, a projection unit 130, a measurement unit 140, a distribution calculation unit 150, a selection unit 160, a determination unit 170, and an output control unit 180. The laser light source 110 emits a light that is a laser light. The projection control unit 120 controls, on the basis of image information, the intensity distribution of the light to be projected, thereby generating an image. The projection unit 130 projects the light controlled by the projection control unit 120. The measurement unit 140 measures the intensity of the light projected from the projection unit 130. The distribution calculation unit 150 calculates, on the basis of the image information, the intensity distribution of the light to be projected from the projection unit 130. The selection unit 160 selects a partial evaluation area of the image which is to be used for determination. The determination unit 170 determines, on the basis of both the light intensity distribution in the evaluation area, calculated by the distribution calculation unit 150, and the light intensity in the evaluation area, measured by the measurement unit 140, whether abnormal projection has occurred. The output control unit 180 controls, on the basis of a determination result of the determination unit 170, either one of the laser light source 110 or the projection control unit 120. Details will be described below.

A light that is a laser light is emitted from the laser light source 110. The light emitted from the laser light source 110 enters the projection control unit 120. In the projection control unit 120, the intensity distribution of the light is controlled on the basis of information of an image to be projected. The light controlled by the projection control unit 120 enters the projection unit 130, and is projected on a screen from the projection unit 130. At this time, the intensity distribution of the light to be projected from the projection unit 130 is measured by the measurement unit 140.

On the other hand, the distribution calculation unit 150 calculates, on the basis of the information of the image to be projected, the intensity distribution of the image to be projected from the projection unit 130. The intensity distribution calculated by the distribution calculation unit 150 is inputted into the selection unit 160 and the output control unit 180. The output control unit 180 controls, on the basis of the intensity distribution calculated by the distribution calculation unit 150, either the laser light source 110 or the projection control unit 120, or both the laser light source 110 and the projection control unit 120 to adjust the intensity of the light to be projected.

The selection unit 160 selects, on the basis of the intensity distribution calculated by the distribution calculation unit 150, a partial evaluation area of the image to be projected, which is to be used for determining whether abnormal output does not occur. The selection unit 160 inputs into the determination unit 170, information indicating the selected evaluation area and information of the intensity in the selected evaluation area of the intensity distribution calculated by the distribution calculation unit 150.

Into the determination unit 170, the information indicating the evaluation area and the information of the intensity in the evaluation area are inputted from the selection unit 160, and furthermore, information indicating the intensity distribution of the projected light is inputted from the measurement unit 140. The determination unit 170 calculates, on the basis of the information indicating the evaluation area inputted from the selection unit 160, the measured intensity of the light in the evaluation area of the intensity distribution information inputted from the measurement unit 140. Then, the determination unit 170 compares the calculated intensity of the light in the evaluation area inputted from the selection unit 160, with the measured intensity of the light in the evaluation area. The determination unit 170 determines, on the basis of a difference between the calculated intensity of the light in the evaluation area and the measured intensity of the light in the evaluation area, whether abnormal projection has occurred from the projection unit 130. A determination result of whether abnormal projection has occurred is inputted into the output control unit 180 from the determination unit 170.

The output control unit 180 controls, on the basis of the determination result of the determination unit 170, either the laser light source 110 or the projection control unit 120, or both the laser light source 110 and the projection control unit 120. The laser light source 110 and the projection control unit 120 are controlled by the output control unit 180 such that the light to be projected from the projection unit 130 has normal intensity distribution or the projection is stopped. Details including the operations of the projection control unit 120 and the determination unit 170 will be described below.

Figure 2:
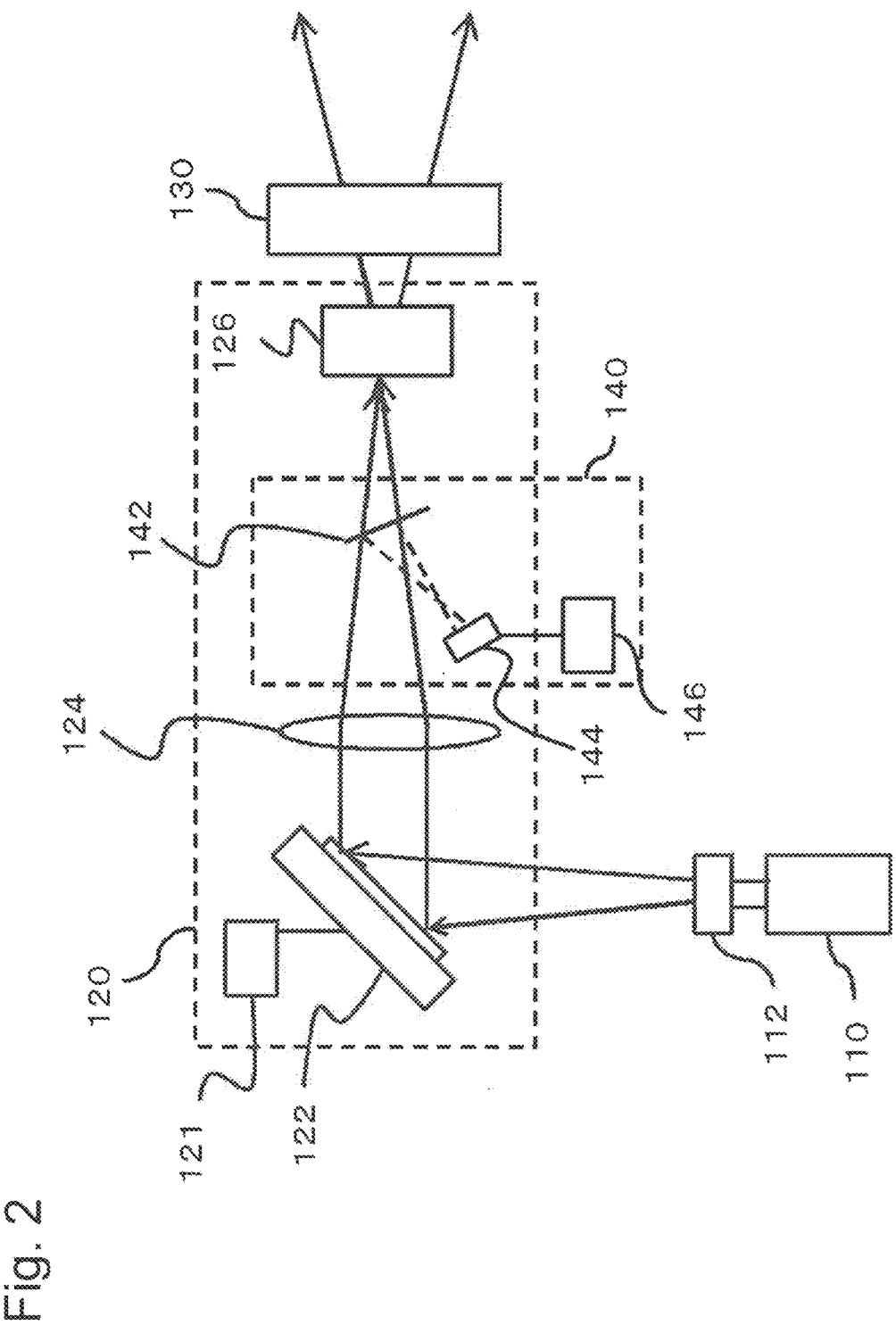
FIG. 2 is a diagram illustrating a configuration example of a laser light source, a projection control unit, a projection unit, and a measurement unit according to the first exemplary embodiment.

FIG. 2 is a diagram illustrating a configuration example of the laser light source 110, the projection control unit 120, the projection unit 130, and the measurement unit 140 according to the present exemplary embodiment. The projection device 10 according to the present exemplary embodiment further includes a shaping optical system 112. The shaping optical system 112 is arranged in front of a light output port of the laser light source 110, and shapes the light emitted from the laser light source 110 into a shape suitable for subsequent phase modulation, Fourier transform, imaging, and projection. Furthermore, the shaping optical system 112 includes a polarizing plate, light passes through the shaping optical system 112, so that light polarization becomes uniform, and the polarization state is maintained until the light is projected from the projection unit 130. The light emitted from the shaping optical system 112 enters a light receiving surface of a phase modulation type spatial modulation element 122.

The projection control unit 120 includes the phase modulation type spatial modulation element 122, a Fourier transform lens 124, and an imaging optical system 126. The measurement unit 140 includes a polarization maintaining element 142, a monitor element 144, and an intensity calculation unit 146. The phase modulation type spatial modulation element 122 phase-modulates the light which has entered the projection control unit 120. The Fourier transform lens 124 Fourier-transforms the light phase-modulated by the phase modulation type spatial modulation element 122. The imaging optical system 126 images the light which has passed through the Fourier transform lens 124. The polarization maintaining element 142 is arranged in a light path of the light which has passed through the Fourier transform lens 124, and reflects a part of the light. The monitor element 144 measures the intensity distribution of the light reflected by the polarization maintaining element 142. The intensity calculation unit 146 calculates, on the basis of the intensity of the light measured by the monitor element 144, the intensity distribution of the light projected from the projection unit 130. Here, the imaging optical system 126 images the light which has passed through the polarization maintaining element 142, and makes the light enter the projection unit 130. The projection unit 130 projects the light which has entered from the imaging optical system 126.

The phase modulation type spatial modulation element 122 is, for example, an element containing ferroelectric liquid crystal, homogeneous liquid crystal, and vertical alignment liquid crystal. The projection control unit 120 further includes a modulation control unit 121, and the modulation control unit 121 changes each of refractive indexes of a plurality of light receiving areas in the phase modulation type spatial modulation element 122 depending on information of each pixel of an image to be projected. Accordingly, the light is phase-modulated, and the information of the image is held by the light.

Alternatively, the phase modulation type spatial modulation element 122 is, for example, a MEMS (Micro Electro Mechanical System) element. A plurality of micromirrors provided with respect to a substrate parallel to the light receiving surface of the phase modulation type spatial modulation element 122 change heights with respect to the substrate, so that a light path length of a reflected light can be changed for each pixel. The modulation control unit 121 changes each of the heights with respect to the substrate of the plurality of micromirrors in the phase modulation type spatial modulation element 122 depending on information of each pixel of an image to be projected. Accordingly, the light is phase-modulated, and the information of the image is held by the light.

The light phase-modulated by the phase modulation type spatial modulation element 122 is diffracted by passing through the Fourier transform lens 124, and moreover, is collected toward the imaging optical system 126. The collected light is imaged by the imaging optical system 126 including a diffuser plate or the like, and is projected by the projection unit 130.

The polarization maintaining element 142 is arranged in the light path between the Fourier transform lens 124 and the imaging optical system 126. A part of the light which has passed through the Fourier transform lens 124 is reflected by the polarization maintaining element 142, and enters the monitor element 144. The rest of the light which has not reflected by the polarization maintaining element 142 passes through the polarization maintaining element 142, and enters the imaging optical system 126. The light polarization is maintained after the light passes through the polarization maintaining element 142. The monitor element 144 is, for example, a photodiode array in which a plurality of light receiving portions are two-dimensionally arranged. The monitor element 144 receives the reflected light reflected from the polarization maintaining element 142, and outputs a signal indicating the intensity distribution of the reflected light to the intensity calculation unit 146. The intensity calculation unit 146 holds conversion information (for example, coefficient, formula, table) indicating a relationship between the intensity distribution of the reflected light and the intensity distribution of the light to be projected from the projection unit 130. Then, the intensity calculation unit 146 calculates the intensity distribution of the light projected from the projection unit 130.

The polarization maintaining element 142 is made of any one of glass, quartz, and optical plastics.

Figure 3:
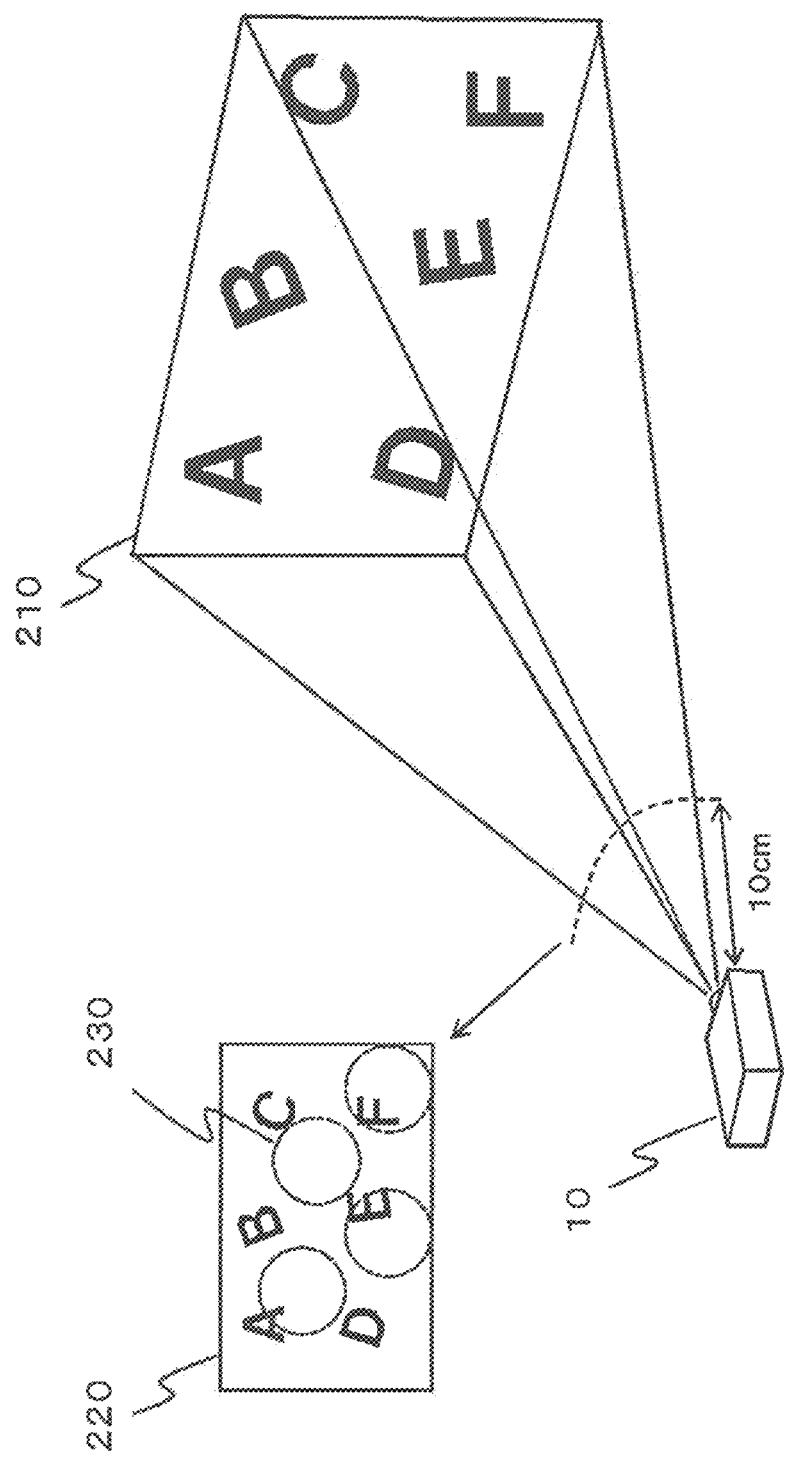
FIG. 3 is a diagram for describing the intensity distribution of a projection light calculated by a distribution calculation unit according to the first exemplary embodiment.
Figure 4:
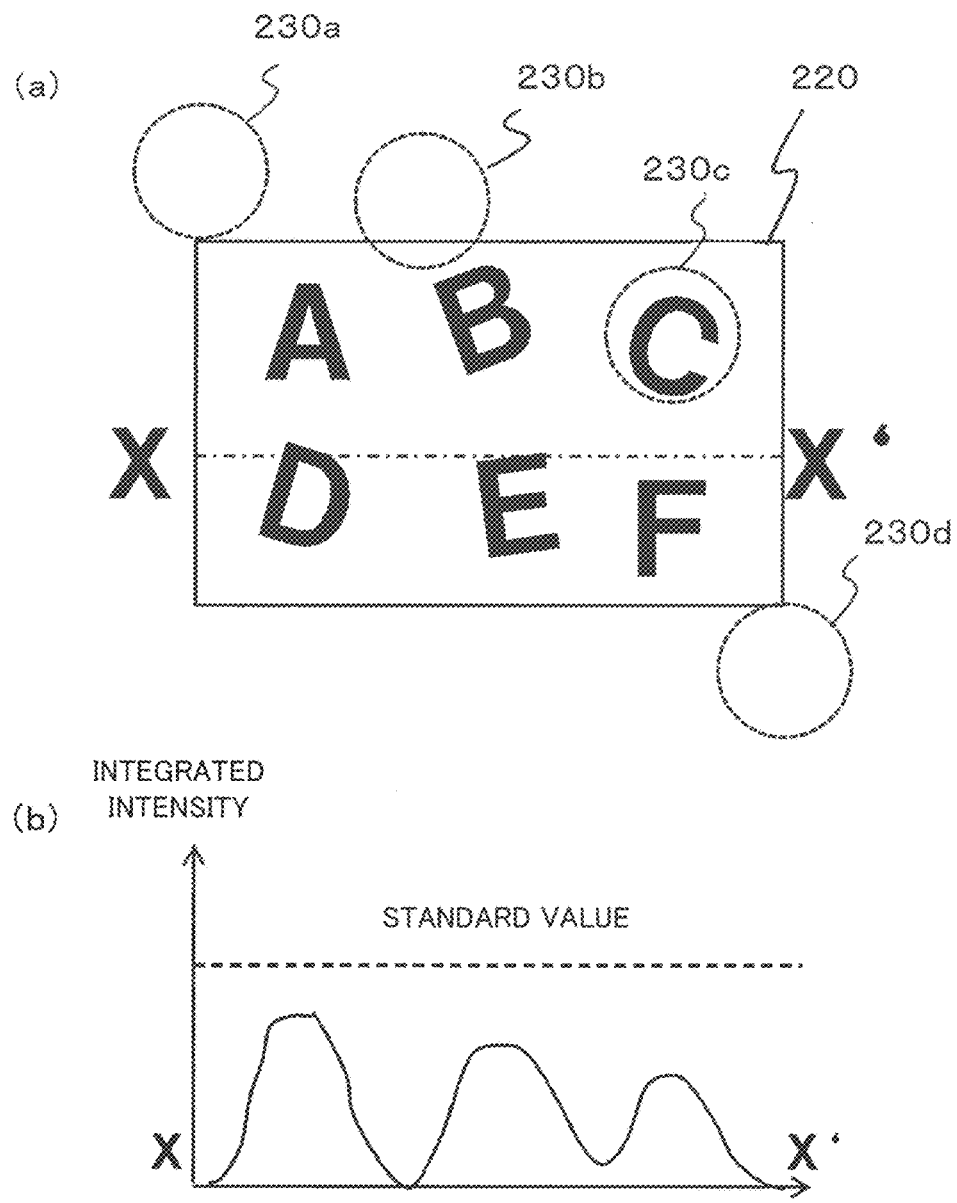
FIG. 4($a$) and FIG. 4($b$) are diagrams for describing the intensity distribution of the projection light calculated by the distribution calculation unit according to the first exemplary embodiment.

FIG. 3, FIG. 4(*a*) and FIG. 4(*b*) are diagrams for describing the intensity distribution of the projection light calculated by the distribution calculation unit 150 according to the present exemplary embodiment. In FIG. 3, the image projected from the projection device 10 is projected on a screen 210. In the projection of the present drawing, for the intensity distribution on a plane 220 located at a distance of 10 cm from a projection port of the projection device 10, safety standards are sometimes set. For example, the plane 220 is not actually a flat surface but a part of a spherical surface centering on the projection source. In the standards, the safety in the case where the projected light enters an eye at a distance of 10 cm from the projection port is assumed. A dashed circle on the plane 220 indicates a range where the light enters the eye at one time, that is, an aperture 230 corresponding to the size of the eye. The projection from the projection device 10 should be performed such that the intensity of the light that enters the aperture 230 does not exceed a set standard value. The standards should be satisfied even when the aperture 230 is located at any position, as long as it includes a projection area in at least a part thereof.

FIG. 4(*a*) is a diagram for describing the intensity distribution that the distribution calculation unit 150 calculates. The distribution calculation unit 150 calculates integrated intensity that is an integrated value of the intensity of the light that enters the aperture 230. The integrated intensity is calculated for each position of the aperture 230, and the distribution thereof is obtained as the intensity distribution. The intensity distribution that the distribution calculation unit 150 calculates includes information indicating an area range in which the intensity is integrated and a value of the integrated intensity associated with the information. Here, in the phase modulation type spatial modulation element 122, all energy can also be concentrated on one point on the screen 210, and if a projection area is only slightly included in the aperture 230, the integrated intensity should be calculated. In the present drawing, an aperture 230*c* is an example in which the whole area in the aperture 230 is a projection area. On the other hand, apertures 230*a*, 230*b*, and 230*d* are examples in each of which only a part of the area in the aperture 230 is a projection area. The distribution calculation unit 150 calculates the integrated intensity also for the apertures 230*a*, 230*b*, and 230*d*. Therefore, the intensity distribution calculated by the distribution calculation unit 150 becomes information of a wider area than the image to be projected.

In the safety standards, the diameter of the aperture 230 is, for example, 7 mm, and a unique standard may be used. In addition, an aperture 230 other than a circular shape may be set.

FIG. 4(*b*) is a diagram illustrating the distribution of the integrated intensity at the section along the line X-X' of FIG. 4(*a*). The maximum value of the integrated intensity and the standard value are compared, and the output control unit 180 controls either the laser light source 110 or the projection control unit 120, or both the laser light source 110 and the projection control unit 120 such that the integrated intensity does not exceed the standard value to adjust the size of the projection intensity.

The intensity distribution information calculated in the distribution calculation unit 150 is inputted into the selection unit 160. The selection unit 160 selects, on the basis of the calculated intensity distribution information, a specific part of the image as the evaluation area. As described in detail below, whether the intensity of the actually-projected light in the evaluation area matches the calculated intensity is a judgement standard of whether abnormal projection has occurred.

The selection unit 160 according to the present exemplary embodiment extracts a peak point, that is, a position having the maximum value of the intensity distribution calculated by the distribution calculation unit 150. A predetermined certain range centering on the peak point is assumed to be a peak area. Here, the peak area is one aperture 230. In other words, the value of the peak point indicates the integrated value of the intensity in the one aperture 230 as the peak area. On that basis, the selection unit 160 selects the peak area as the evaluation area. The selection unit 160 inputs into the determination unit 170, information indicating the selected evaluation area and the intensity in the evaluation area, that is, information of the value of the peak point.

Into the determination unit 170, the information indicating the evaluation area and the information of the intensity in the evaluation area are inputted from the selection unit 160, and furthermore, the information indicating the intensity distribution of the projected light is inputted from the measurement unit 140. The intensity inputted from the selection unit 160 is referred to as a calculated integrated intensity. On the other hand, the determination unit 170 extracts, from the information indicating the evaluation area inputted from the selection unit 160, and the intensity distribution of the projected light inputted from the measurement unit 140, the intensity distribution of the actually-projected light in the evaluation area and calculates the integrated value of the intensity in the evaluation area. The integrated value is referred to as a measured integrated intensity.

The determination unit 170 calculates a difference between the calculated integrated intensity and the measured integrated intensity in the evaluation area, and performs determination on the basis of the size of the difference. The determination unit 170 stores predetermined first, second, and third standard ranges. The first standard range indicates a range where the calculated difference is sufficiently small and it can be decided that expected projection is performed. The third standard range indicates a range where the calculated difference is large and it is considered that unexpected projection occurs. The second standard range is a range that is not included in both the first standard range and the third standard range, and specifically, indicates a range where both an abnormality and a normality cannot be decided.

The determination unit 170 calculates a difference between the calculated integrated intensity and the measured integrated intensity in the evaluation area. Firstly, when the difference is within the predetermined first standard range, the determination unit 170 determines that abnormal projection does not occur, that is, "normality". Then, the determination unit 170 inputs the determination result "normality" into the output control unit 180, and the projection device 10 continues the projection of the image when the evaluation is performed until the image information to be projected is changed to other image information. Secondly, when the difference is within the predetermined third standard range, the determination unit 170 determines that abnormal projection has occurred. Then, the determination unit 170 inputs the determination result "abnormality" into the output control unit 180. The output control unit 180 controls, on the basis of the determination result, the laser light source 110 and the projection control unit 120 to stop the projection. Thirdly, when the difference is within the predetermined second standard range, the determination unit 170 inputs the determination result "re-evaluation" into the output control unit 180. The output control unit 180 controls either the laser light source 110 or the projection control unit 120, or both the laser light source 110 and the projection control unit 120 so as to correct the difference between the calculated integrated intensity and the measured integrated intensity. Then, the difference between the calculated integrated intensity and the measured integrated intensity is calculated again in the same manner in the determination unit 170. When the difference is within the first standard range, the determination unit 170 determines that abnormal projection does not occur, that is, "normality". Then, the determination unit 170 inputs the determination result "normality" into the output control unit 180. Then, the output control unit 180 controls the projection control unit 120 so as to continue the projection of the image when the evaluation is performed until the image information to be projected is changed to other image information. On the other hand, when the difference is once again within the second standard range or within the third standard range, the determination unit 170 determines that abnormal projection has occurred. Then, the determination unit 170 inputs the determination result "abnormality" or "second re-evaluation" into the output control unit 180. The output control unit 180 controls, on the basis of the determination result, the laser light source 110 and the projection control unit 120 to stop the projection.

The first standard range is, for example, less than 2% of the calculated integrated intensity, the second standard range is, for example, 2% or more and less than 10% of the calculated integrated intensity, and the third standard range is, for example, 10% or more of the calculated integrated intensity. The reason why the determination of the first "re-evaluation" is permitted is to prevent a decision of an abnormality by a slight error.

Figure 5:
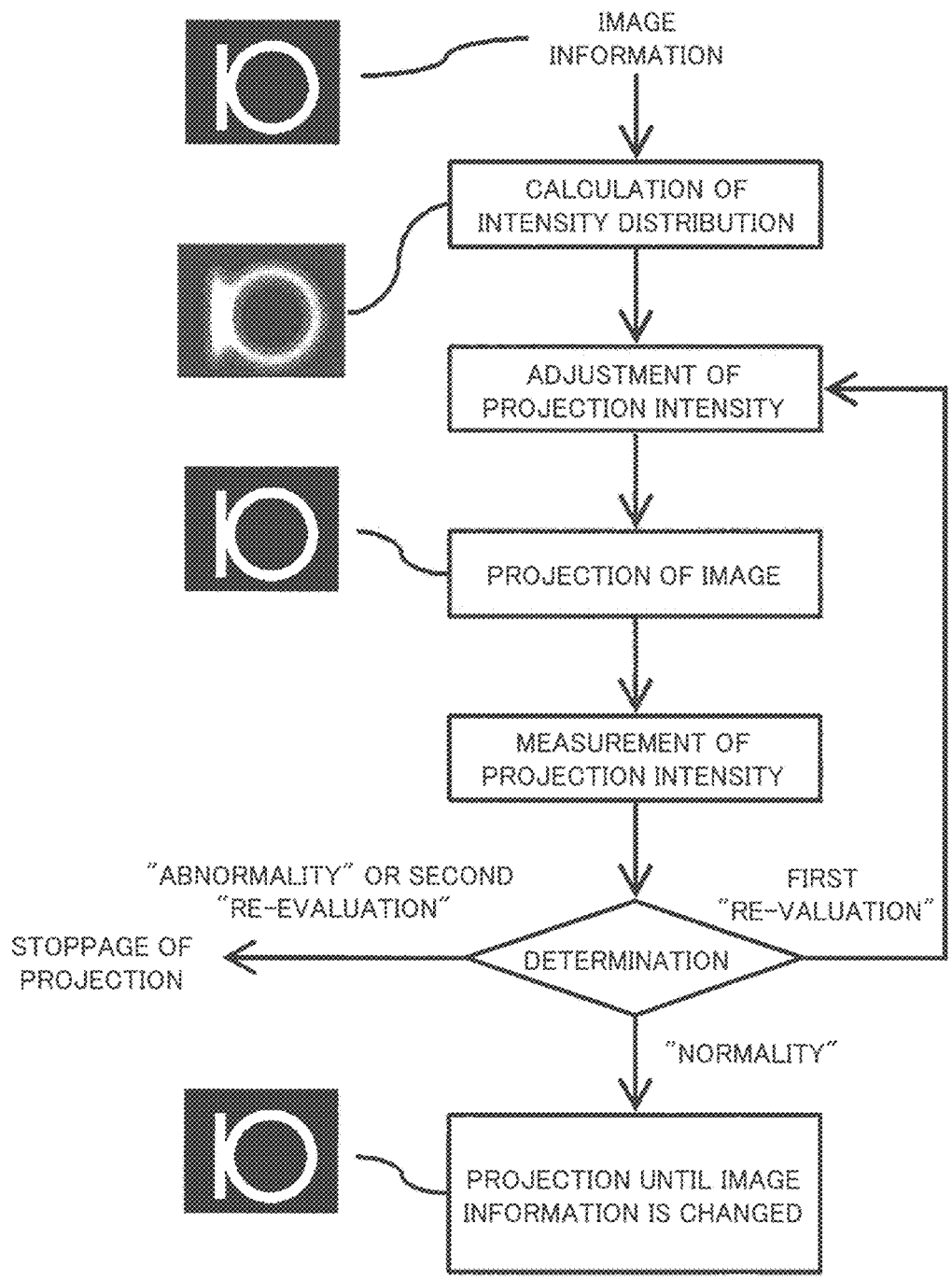
FIG. 5 is a diagram illustrating an operation flow of the projection device according to the first exemplary embodiment.

FIG. 5 is a diagram illustrating an operation flow of the projection device 10 according to the present exemplary embodiment. An image sample is illustrated on the left side of each block of the flow. The light intensity is high in a white part of the image sample. An operation of the projection device 10 according to the present exemplary embodiment described above will be described with reference to the present drawing. In the distribution calculation unit 150, the intensity distribution is calculated on the basis of the image information. The projection intensity is adjusted by the output control unit 180 such that the peak value of the calculated intensity distribution does not exceed the standard value. Then, the image is projected from the projection unit 130 at the adjusted intensity. At this time, the intensity distribution of the projected light is measured by the measurement unit 140. The determination of whether abnormal projection has occurred is performed in the determination unit 170 on the basis of the actually-projected intensity and the calculated intensity in the evaluation area. When it is determined to be "normality", the projection of the image when the evaluation is performed is continued until the image information is changed to other image information. When it is determined to be the first "re-evaluation", the adjustment of the projection intensity, the projection of the image, the measurement of the projection intensity, and the determination are performed again. Then, when it is determined to be "abnormality" or the second "re-evaluation", the control to stop the projection is performed by the output control unit 180.

When the image to be projected is changed, the distribution calculation unit 150 calculates the intensity distribution again, and inputs the intensity distribution into the selection unit 160 and the output control unit 180. Then, the output control unit 180 adjusts the projection intensity, and the image is projected from the projection unit 130. The selection unit 160 newly selects the evaluation area, and the determination is performed in the determination unit 170.

In the operation flow according to the present exemplary embodiment, when it is determined to be "normality", the projection is continued until the image information is changed. However, when the image information is not changed, it is preferable that the determination be performed at every predetermined time, for example, at every one second or a few seconds.

Next, an operation and effect of the present exemplary embodiment will be described. In the projection device 10 according to the present exemplary embodiment, the determination unit 170 performs the determination on the basis of the measured value of the intensity of the actually-projected light. Therefore, it is possible to detect abnormal output in which a light of unexpected intensity is projected, control the intensity of the projection light, and stop the projection.

Second Exemplary Embodiment

Figure 6:
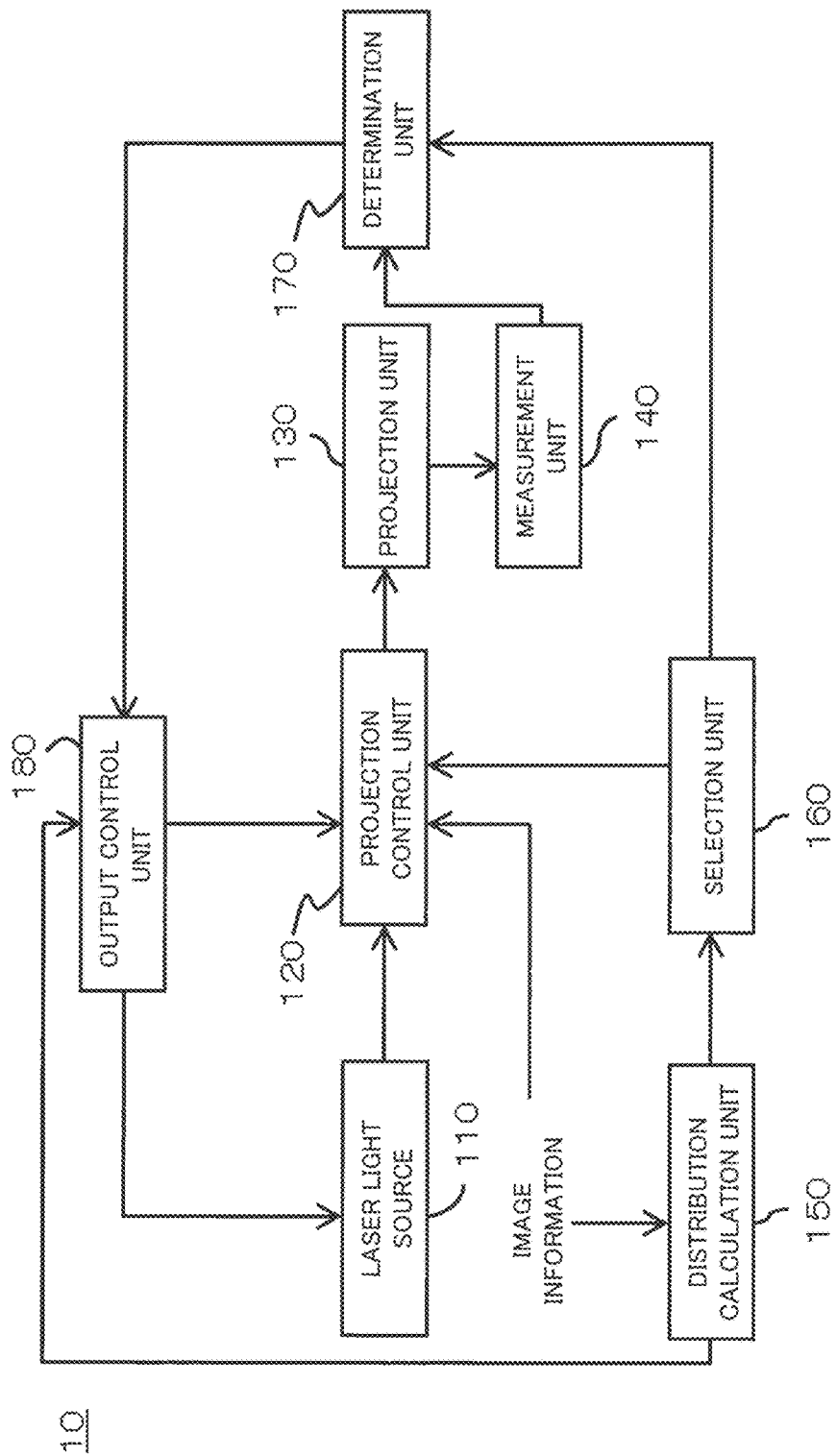
FIG. 6 is a diagram illustrating a configuration example of a projection device according to a second exemplary embodiment.

FIG. 6 is a diagram illustrating a configuration example of the projection device 10 according to a second exemplary embodiment. The projection device 10 according to the present exemplary embodiment has the same configuration as the first exemplary embodiment, except that a projection control unit 120 controls, on the basis of the information indicating the evaluation area, the intensity distribution of the light to be projected, and a photodiode having one light receiving portion is used as a monitor element 144 in place of the photodiode array. However, since the monitor element 144 is different, details of processing performed in a selection unit 160 and an output control unit 180 are also different.

In the projection device 10 according to the present exemplary embodiment, a light that is a laser light is emitted from a laser light source 110. The light emitted from the laser light source 110 enters the projection control unit 120.

In the projection control unit 120, the intensity distribution of a light is controlled on the basis of information of an image to be projected. The light controlled by the projection control unit 120 enters a projection unit 130, and is projected on a screen from the projection unit 130. At this time, the intensity of the light to be projected from the projection unit 130 is measured by a measurement unit 140.

The projection control unit 120 includes a phase modulation type spatial modulation element 122, a Fourier transform lens 124, and an imaging optical system 126. The measurement unit 140 includes a polarization maintaining element 142, the monitor element 144, and an intensity calculation unit 146. The phase modulation type spatial modulation element 122 phase-modulates the light which has entered the projection control unit 120. The Fourier transform lens 124 Fourier-transforms the light phase-modulated by the phase modulation type spatial modulation element 122. The imaging optical system 126 images the light which has passed through the Fourier transform lens 124. The polarization maintaining element 142 is arranged in a light path of the light which has passed through the Fourier transform lens 124, and reflects a part of the light. The monitor element 144 measures the intensity of the light reflected by the polarization maintaining element 142. The intensity calculation unit 146 calculates, on the basis of the intensity of the light measured by the monitor element 144, the intensity of the light projected from the projection unit 130. Here, the imaging optical system 126 images the light which has passed through the polarization maintaining element 142, and makes the light enter the projection unit 130. The projection unit 130 projects the light which has entered from the imaging optical system 126.

Next, a distribution calculation unit 150, a selection unit 160, a determination unit 170, and an output control unit 180 according to the present exemplary embodiment will be described. The distribution calculation unit 150 calculates, on the basis of the information of the image to be projected, the intensity distribution of the image to be projected from the projection unit 130. The intensity distribution calculated by the distribution calculation unit 150 is inputted into the selection unit 160 and the output control unit 180. The output control unit 180 controls, on the basis of the intensity distribution calculated by the distribution calculation unit 150, either the laser light source 110 or the projection control unit 120, or both the laser light source 110 and the projection control unit 120 to adjust the intensity of the light to be projected.

The selection unit 160 selects, on the basis of the intensity distribution calculated by the distribution calculation unit 150, a partial evaluation area of the image to be projected, which is to be used for determining whether abnormal output does not occur. The selection unit 160 inputs into the projection control unit 120, information indicating the selected evaluation area. The projection control unit 120 controls, on the basis of the information indicating the evaluation area inputted from the selection unit 160, the intensity distribution of the light to be projected such that only the evaluation area is projected. In addition, the selection unit 160 inputs into the determination unit 170, information of the intensity in the selected evaluation area of the intensity distribution calculated by the distribution calculation unit 150.

Into the determination unit 170, the information of the intensity in the evaluation area is inputted from the selection unit 160, and furthermore, information indicating the intensity of the projected light is inputted from the measurement unit 140. The determination unit 170 compares the calculated intensity of the light in the evaluation area inputted from the selection unit 160, with the measured intensity of the light when only the evaluation area is projected. The determination unit 170 determines, on the basis of a difference between the calculated intensity of the light in the evaluation area and the measured intensity of the light in the evaluation area, whether abnormal projection has occurred from the projection unit 130. A determination result of whether abnormal projection has occurred is inputted into the output control unit 180 from the determination unit 170.

The output control unit 180 controls, on the basis of the determination result of the determination unit 170, either the laser light source 110 or the projection control unit 120, or both the laser light source 110 and the projection control unit 120. The laser light source 110 and the projection control unit 120 are controlled by the output control unit 180 such that the light to be projected from the projection unit 130 has normal intensity distribution or the projection is stopped. Details including the operations of the projection control unit 120 and the determination unit 170 will be described below.

Figure 7:
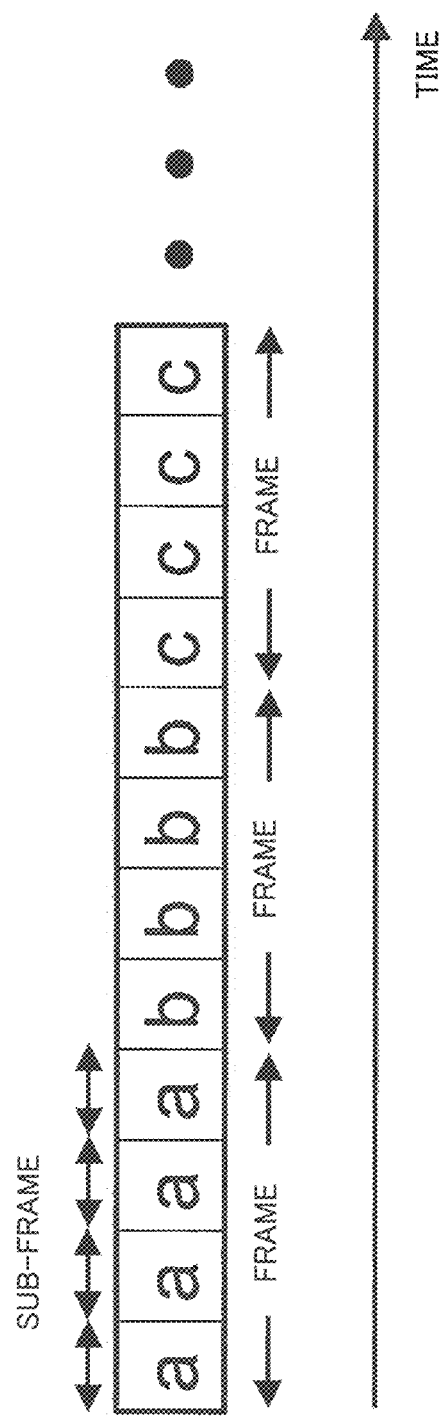
FIG. 7 is a diagram illustrating an example of a frame structure in a time axis of the projection device according to the second exemplary embodiment.

FIG. 7 is a diagram illustrating an example of a frame structure in a time axis of the projection device 10 according to the present exemplary embodiment. Here, a frame structure in a time axis when the projection device 10 according to the present exemplary embodiment projects continuous different images will be described. The projection of the continuous images is constituted of a plurality of frames in the time axis as in the present drawing. For example, images of 30 frames are continuously projected in one second to constitute a picture. One frame is further composed of a plurality of sub-frames. The number of sub-frames that constitute one frame is unified by the number that is predetermined. The same images are usually projected in all sub-frames of one frame. In the example of the present drawing, one frame is constituted of, but not limited to, four sub-frames. The time of one sub-frame is, for example, a few milliseconds. In the case of projecting a color image or a color picture, images having different colors may be projected for every one frame. For example, images of red, blue, and green are continuously and sequentially projected for every one frame, and can be made to be viewed as a color image as a whole. In addition, the same images may be projected over a plurality of frames.

The distribution calculation unit 150 calculates the intensity distribution of the image to be projected in the same manner as the first exemplary embodiment. In addition, the selection unit 160 selects the evaluation area in the same manner as the first exemplary embodiment.

Into the projection control unit 120, the information indicating the evaluation area is inputted from the selection unit 160, and the projection control unit 120 controls the intensity distribution of the light to be projected such that only the evaluation area is projected during certain one sub-frame. The measurement unit 140 measures the intensity of the projected light when only the evaluation area is projected, and inputs the intensity into the determination unit 170. Since the monitor element 144 is one photodiode, the intensity measured at this time is the integrated intensity of the projected light in the evaluation area. The intensity is referred to as the measured integrated intensity. On the other hand, into the determination unit 170, the information of the calculated intensity in the evaluation area is inputted from the selection unit 160. The intensity is referred to as the calculated integrated intensity.

The determination unit 170 calculates a difference between the calculated integrated intensity and the measured integrated intensity in the evaluation area, and performs determination on the basis of the size of the difference in the same manner as the method according to the first exemplary embodiment.

When it is determined to be "normality" in the determination unit 170, the determination result is inputted into the output control unit 180. Then, the output control unit 180 controls the projection control unit 120 such that only an area other than the evaluation area of the image to be projected is projected during certain one sub-frame. After only the area other than the evaluation area is projected, the projection of the image when the evaluation is performed is continued until the image information to be projected is changed to other image information. The operation when it is determined to be "abnormality" and "re-evaluation" in the determination unit 170 is the same as the first exemplary embodiment. The area other than the evaluation area may be projected during one sub-frame from when it is determined to be the first "re-evaluation" to when the projection of the evaluation area is performed again.

Figure 8:
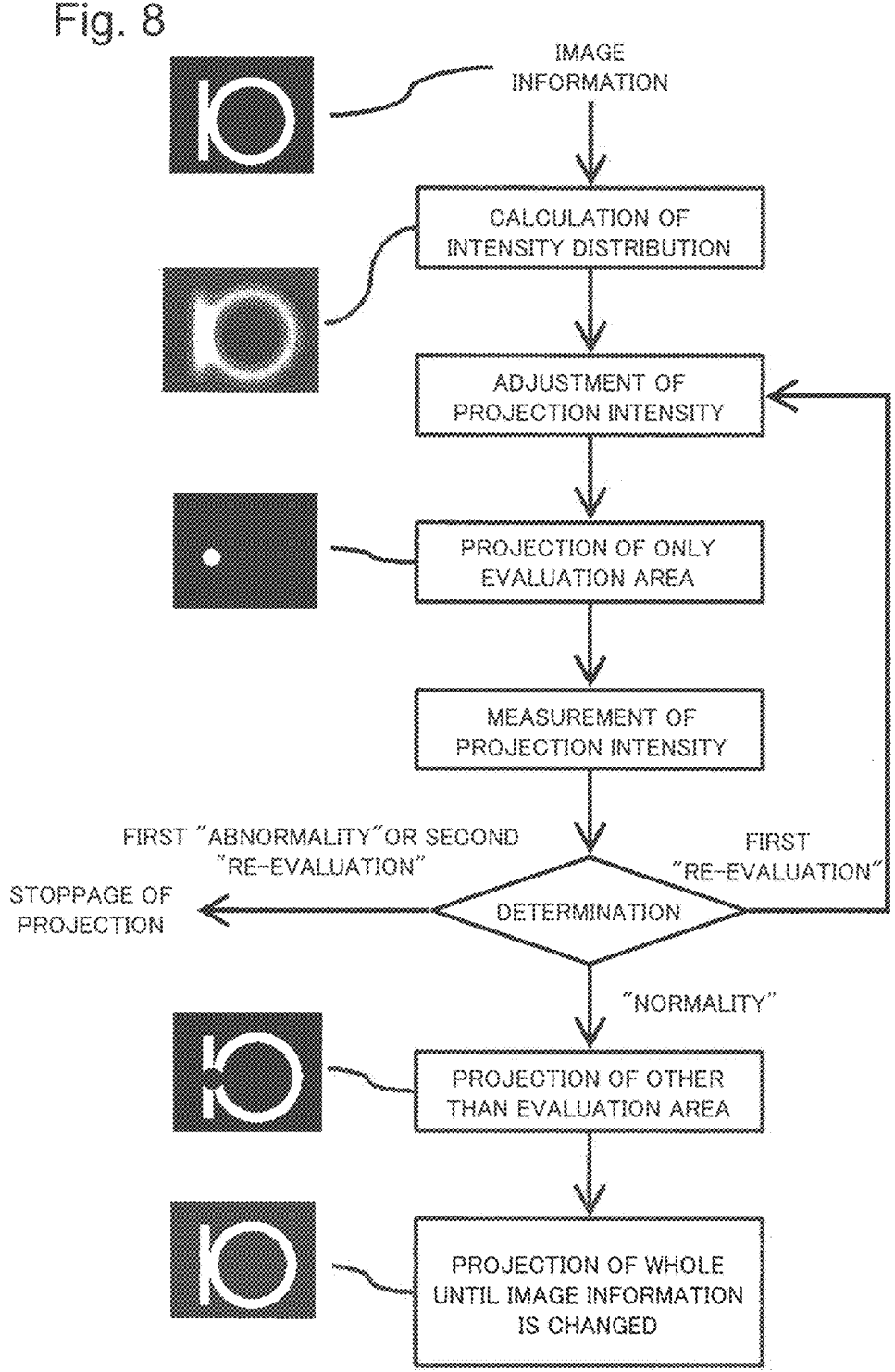
FIG. 8 is a diagram illustrating an operation flow of the projection device according to the second exemplary embodiment.

FIG. 8 is a diagram illustrating an operation flow of the projection device 10 according to the present exemplary embodiment. An image sample is illustrated on the left side of each block of the flow. The light intensity is high in a white part of the image sample. An operation of the projection device 10 according to the present exemplary embodiment described above will be described with reference to the present drawing. In the distribution calculation unit 150, the intensity distribution is calculated on the basis of the image information. The projection intensity is adjusted by the output control unit 180 such that the peak value of the calculated intensity distribution does not exceed the standard value. Then, the image is projected from the projection unit 130 at the adjusted intensity. At this time, the image to be projected is only the part of the evaluation area selected by the selection unit 160. Then, the intensity distribution of the projected light in the evaluation area is measured by the measurement unit 140. The determination of whether abnormal projection has occurred is performed in the determination unit 170 on the basis of the actually-projected intensity and the calculated intensity in the evaluation area. When it is determined to be "normality", the whole area of the image is projected until the image information is changed to other image information after the area other than the evaluation area of the image is projected during one sub-frame. When it is determined to be the first "re-evaluation", the adjustment of the projection intensity, the projection of the image, the measurement of the projection intensity, and the determination are performed again. Then, when it is determined to be "abnormality" or the second "re-evaluation", the control to stop the projection is performed by the output control unit 180.

The reason why the part other than the evaluation area of the image is projected in the present exemplary embodiment is to make a person who views an image projected on a screen recognize an image to be projected naturally. In general, projection of only a part of the image generates an unnatural visual impact for a viewer. Thus, after only a part of the image is projected, a part other than the part is continuously projected. Then, the image of the part and the image of the other part are synthesized by a residual image, and recognized as a natural image. Therefore, it is preferable that the projection of only the evaluation area and the projection of the area other than the evaluation area be continuously performed. When the projection of only the evaluation area and the projection of the area other than the evaluation area are not continuously performed, an unnatural state such as color breakup is generated. In addition, it is preferable that the projection of only the evaluation area and the projection of the area other than the evaluation area be performed in the same frame. This is because, if the projection of only the evaluation area and the projection of the area other than the evaluation area are performed in different frames, respectively, an unnatural state such as color breakup is generated also in that case.

In the present exemplary embodiment, after the projection of only the evaluation area is performed, the projection of the area other than the evaluation area is performed. However, when the operation of the projection device 10 is very fast and time of the sub-frame is extremely short, the projection of the area other than the evaluation area need not be performed.

When the image to be projected is changed, the distribution calculation unit 150 calculates the intensity distribution again, and inputs the intensity distribution into the selection unit 160 and the output control unit 180. Then, the output control unit 180 adjusts the projection intensity. The selection unit 160 newly selects the evaluation area, and the projection of the evaluation area and the determination are performed.

In the operation flow according to the present exemplary embodiment, when it is determined to be "normality", the projection is continued until the image information is changed. However, when the image information is not changed, it is preferable that the determination be performed at every predetermined time, for example, for every one frame.

Although the case where a photodiode having one light receiving portion is used as the monitor element 144 is described in the present exemplary embodiment, a photodiode array may be used as is the case with the first exemplary embodiment.

Next, an operation and effect of the present exemplary embodiment will be described. In the present exemplary embodiment, the same operation and effect as the first exemplary embodiment can be obtained. In addition, since one photodiode can be used as the monitor element 144, the degree of freedom in design can be improved.

Third Exemplary Embodiment

Figure 9:
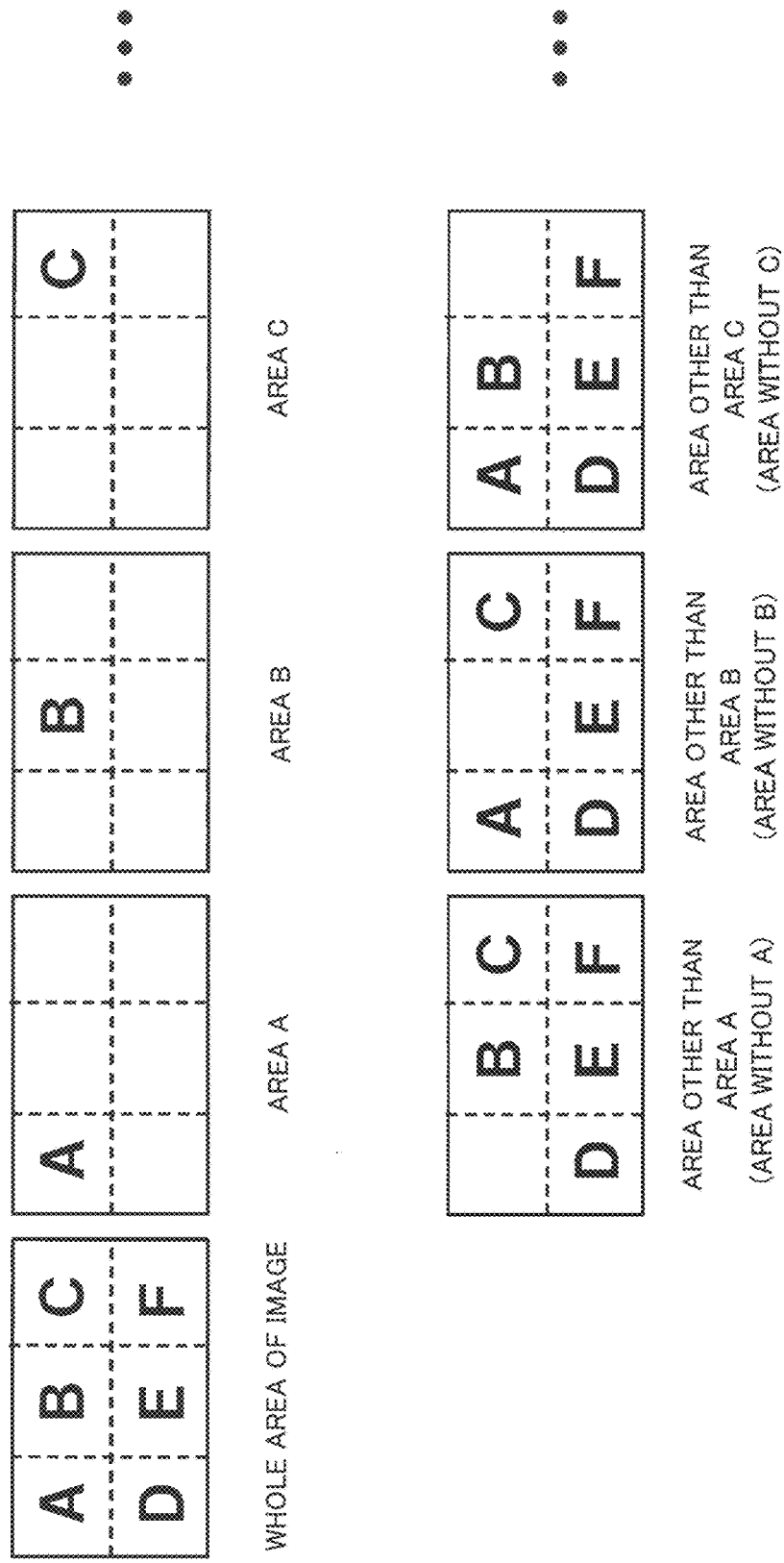
FIG. 9 is a diagram for describing an evaluation area according to a third exemplary embodiment.

FIG. 9 is a diagram for describing an evaluation area according to a third exemplary embodiment. A projection device 10 according to the present exemplary embodiment has the same configuration as the second exemplary embodiment, except that a distribution calculation unit 150 divides the image into a plurality of areas to calculate the distribution intensity, and a selection unit 160 sequentially selects these areas as the evaluation area.

The distribution calculation unit 150 according to the present exemplary embodiment divides the image to be projected into a plurality of areas. Each of the plurality of areas obtained by the division is referred to as a divided area. A dividing method may be unambiguously predetermined, and need not depend on the intensity distribution of the image to be projected. The image may be divided equally or may be divided such that the sizes are different depending on the areas. The whole area of the image to be projected is placed in any of the divided areas. Furthermore, the distribution calculation unit 150 calculates the integrated intensity of the light to be projected in each of the divided areas. A selection unit 160 selects one of the plurality of divided areas as the evaluation area. Then, only the divided area selected as the evaluation area is projected, and the intensity of the projected light is measured. A determination unit 170 performs the determination of whether abnormal projection has occurred in the divided area, from the comparison between the calculated integrated intensity and the measured integrated intensity, in the same manner as the second exemplary embodiment. The selection unit 160 sequentially selects the divided areas one by one as the evaluation area. In other words, the projection and the determination are sequentially performed for all of the divided areas. In the present exemplary embodiment, the evaluation is performed for the whole area of the image to be projected, and thus abnormal projection that cannot be expected from the intensity distribution can be detected without being overlooked. Details will be described below.

FIG. 9 is a diagram for describing the distribution calculation unit 150, the selection unit 160, the determination unit 170, and an output control unit 180 according to the present exemplary embodiment. The distribution calculation unit 150 divides the whole area of the image to be projected into areas A to F, for example, as in the present drawing. In the present drawing, the solid line indicates the outer periphery of the image to be projected, and the dashed line indicates a line that divides the image. The present exemplary embodiment illustrates an example in which the image is divided into six equally rectangular areas, but is not limited thereto.

The distribution calculation unit 150 calculates integrated intensity that is an integrated value of the intensity of the light in each of the divided areas. The integrated intensity is calculated for each of the divided areas, and is obtained as the intensity distribution. The intensity distribution that the distribution calculation unit 150 calculates includes information indicating an area range in which the intensity is integrated and a value of the integrated intensity associated with the information. Firstly, the selection unit 160 selects one of the divided areas as the evaluation area. Here, for example, the area A is selected. Then, the selection unit 160 inputs into the projection control unit 120, information indicating the area range of the area A, and inputs into the determination unit 170, the integrated intensity calculated in the distribution calculation unit 150 regarding the area A. Then, in the same manner as the operation according to the second exemplary embodiment, only the area A that is the evaluation area is projected, the intensity of the projected light is measured by the measurement unit 140, and the determination of whether abnormal projection has occurred is performed by the determination unit 170.

When it is determined to be "normality" in the determination unit 170, the determination result is inputted into the output control unit 180. Then, the output control unit 180 controls the projection control unit 120 such that only an area other than the evaluation area, such as "area without A" in FIG. 9, is projected during certain one sub-frame. After only the area other than the evaluation area is projected, the projection of the whole area of the image is continued till moving to a next frame. When it is determined to be the first "re-evaluation" in the determination unit 170, the adjustment of the projection intensity, the projection of the evaluation area, the measurement of the projection intensity, and the determination are performed again. Then, when it is determined to be "abnormality" or the second "re-evaluation", the control to stop the projection is performed by the output control unit 180. The area other than the evaluation area may be projected during one sub-frame from when it is determined to be the first "re-evaluation" to when the projection of the evaluation area is performed again.

Figure 10:
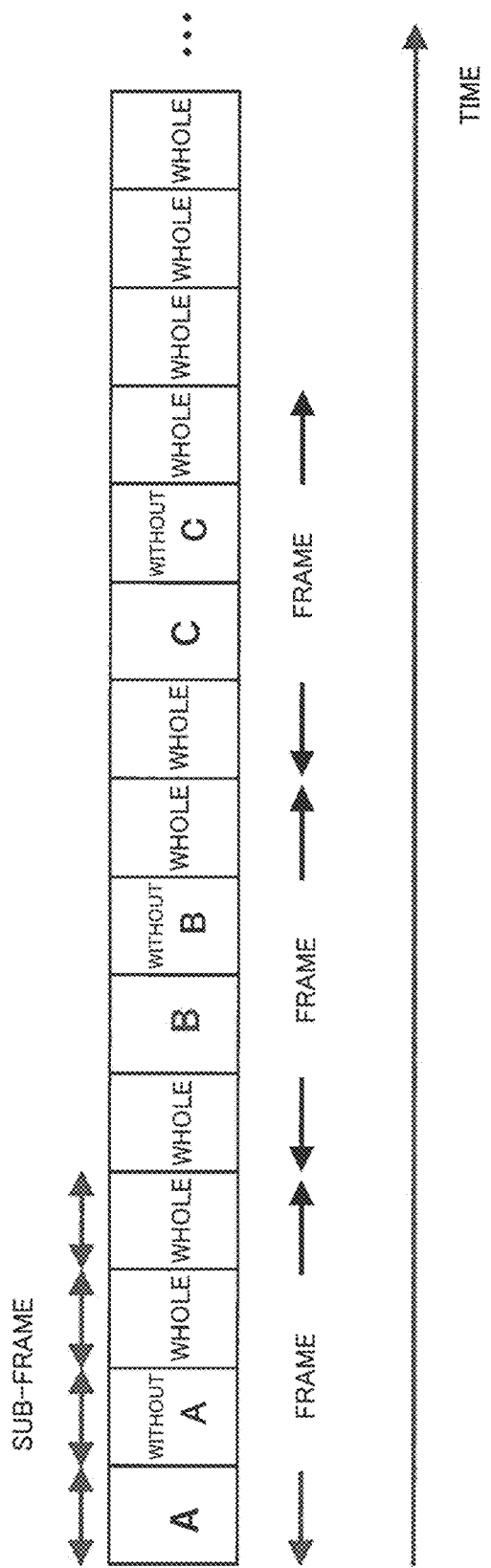
FIG. 10 is a diagram illustrating an example of a projection sequence according to the third exemplary embodiment.

FIG. 10 is a diagram illustrating an example of a projection sequence according to the present exemplary embodiment. After the determination is performed in the determination unit 170, and then switching to another frame is performed, the selection unit 160 selects a next divided area as the evaluation area. Here, for example, the area B is selected as the evaluation area. Then, similarly, only the area B is projected, and the determination of whether abnormal projection has occurred is performed. In this manner, the selection unit 160 sequentially selects the divided areas as the evaluation area by switching in a frame unit. However, the selection unit 160 may select the evaluation area in any order as long as it selects all of the divided areas. Then, after the last divided area is selected as the evaluation area, the selection unit 160 selects the firstly-selected divided area as the evaluation area again, and the evaluation is repeatedly continued. For example, after the areas A to F are sequentially selected, the area A is selected again. However, without limiting thereto, the projection of the whole image may be continued until the image information is changed to other image information instead of repeatedly continuing the evaluation after the last divided area is selected as the evaluation area.

The present drawing illustrates an example of the case where the projection of three frames is performed without an abnormality and all of the determination results in the selection unit 160 are "normality". An area that is projected is described in a cell indicating each sub-frame. In one frame, in a next sub-frame of a sub-frame in which any of the areas A to F is projected as the evaluation area, an area other than the projected divided area is projected. For example, in a next sub-frame of a sub-frame in which the area A is projected, the area without A is projected. In a sub-frame other than the sub-frames in which the area A and the area without A are projected, the whole area is projected. Then, after moving to a next frame, for example, the area B is projected as the evaluation area, and the area without B is projected in a next sub-frame. It is to be noted that the projection of the evaluation area and the projection of the area other than the evaluation area may be performed in any sub-frame. However, it is preferable that the projection of the evaluation area and the projection of the area other than the evaluation area be continuously performed and do not extend across different frames. In addition, a frame that displays the whole image may exist in all of sub-frames in a frame. In addition, a plurality of pairs of the projection of the evaluation area and the projection of the area other than the evaluation area may be performed in one frame.

When the projection for the determination, that is, the projection of only the evaluation area and the projection of other than the evaluation area are performed at certain timing, a viewer may recognize the pattern. Therefore, it is preferable that the projection for the determination be irregularly performed in the short term. In the present drawing, the projection of the area A is performed in the first sub-frame of a frame, and the projection of the area B and the projection of the area C are performed in the second sub-frame.

When the frame is changed and the image to be projected is changed, the distribution calculation unit 150 calculates the intensity distribution again, and inputs the intensity distribution into the selection unit 160 and the output control unit 180. Then, the output control unit 180 adjusts the projection intensity. The selection unit 160 selects the evaluation area, and the projection of the evaluation area and the determination are performed. At this time, the selecting order of the evaluation area may be returned to the first divided area (for example, area A) or may be continued from the previous frame.

Also in the present exemplary embodiment, the adjustment of the projection intensity is performed on the basis of the intensity distribution calculated by the distribution calculation unit 150 before the projection of the image for the determination is performed, in the same manner as the first and second exemplary embodiments. At this time, the intensity distribution based on the divided areas may be used, or for example, the intensity distribution based on areas that are divided more finely may be separately calculated in the distribution calculation unit 150 and used. However, the standard value with respect to each integrated intensity should be set depending on the size of the area in which each integrated intensity is calculated. The standard value is set to be larger as the area becomes larger.

Next, an operation and effect of the present exemplary embodiment will be described. In the present exemplary embodiment, the same operation and effect as the first and second exemplary embodiments can be obtained. In addition, the following operation and effect can be obtained.

Figure 11:
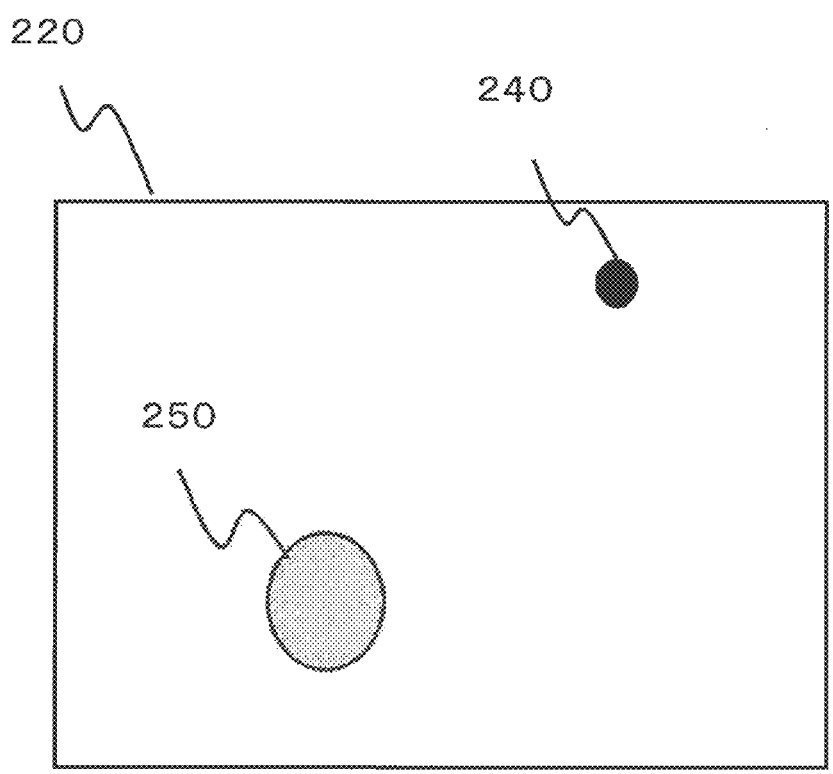
FIG. 11 is a diagram for describing an operation and effect of the third exemplary embodiment.

FIG. 11 is a diagram for describing an operation and effect of the present exemplary embodiment. The present drawing illustrates a state where, on the plane 220 on which the safety evaluation is performed, the position of an unexpected peak 240 is different from the position of a calculated peak 250. Such a state may be generated due to an abnormality of the projection device 10, in particular, the phase modulation type spatial modulation element 122. Although the position of the unexpected peak 240 cannot be expected from the intensity distribution, the projection device 10 according to the present exemplary embodiment performs the determination using sequentially the divided areas in the intensity distribution information generated by the distribution calculation unit 150 as the evaluation area, and thus an abnormality can be detected. In this manner, in the projection device 10 according to the present exemplary embodiment, without limiting to the position of the calculated peak 250, it is possible to detect abnormal output in which a light of unexpected intensity is projected, control the intensity of the projection light, and stop the projection.

Fourth Exemplary Embodiment

Figure 12:
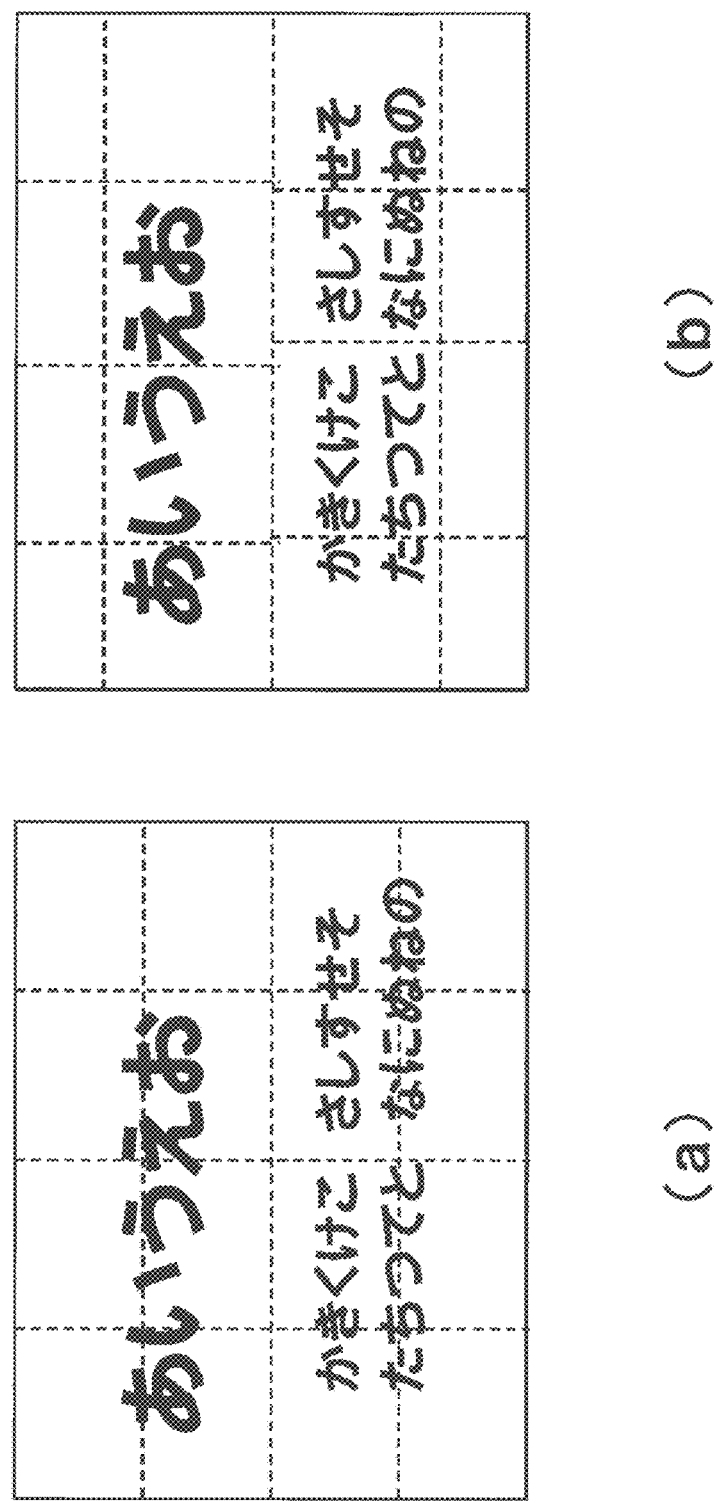
FIG. 12($a$) is a diagram illustrating an example of divided areas generated by equally dividing an image, and FIG. 12($b$) is a diagram illustrating an example of divided areas generated by a method according to a fourth exemplary embodiment.

FIGS. 12(a) and 12(b) are diagrams for describing divided areas according to the present exemplary embodiment. A projection device 10 according to the present exemplary embodiment has the same configuration as the third exemplary embodiment, except a setting method of the divided areas by a distribution calculation unit 150. In the present drawings, the intensity of the light to be projected is high in a black part.

As illustrated in FIG. 12(b), the distribution calculation unit 150 according to the present exemplary embodiment generates divided areas such that the intensity of the light at the boundary of the divided areas of the image to be projected is smaller than the average value of the intensity of the light of the whole image. For example, the number of the divided areas to be generated is predetermined, and the sizes of the respective divided areas are adjusted such that the intensity of the light at the boundary of the divided areas is smaller than the average value of the intensity of the light of the whole image. With respect to the generated respective divided areas, the distribution calculation unit 150 obtains the integrated intensity of the light and calculates the intensity distribution. In the same manner as the third exemplary embodiment, a selection unit 160 sequentially selects the respective divided areas as the evaluation area, and the determination of whether abnormal projection occurs is performed by a determination unit 170.

Next, an operation and effect of the present exemplary embodiment will be described. In the present exemplary embodiment, the same operation and effect as the first, second, and third exemplary embodiments can be obtained. In addition, the following operation and effect can be obtained.

FIG. 12(a) is a diagram illustrating an example of divided areas generated by equally dividing an image, and FIG. 12(b) is a diagram illustrating an example of the divided areas generated by the method according to the present exemplary embodiment. In the case of the equal division, the boundary of the divided areas may be positioned at a part where the intensity of the light is high. In the case of the foregoing division, a viewer may visually recognize a slight clearance due to the division depending on conditions, such as a time width of the sub-frame and luminance of the image. In particular, the foregoing problem easily occurs when there is high contrast as in characters. In the present exemplary embodiment, the boundary of the divided areas is usually set at a part where the intensity of the light is low, and thus the visual recognition of the divided areas can be prevented.

Fifth Exemplary Embodiment

A projection device 10 according to a fifth exemplary embodiment is the same as the projection device 10 according to the third exemplary embodiment, except that a selection unit 160 sequentially selects the plurality of divided areas and the peak area as the evaluation area.

A distribution calculation unit 150 according to the present exemplary embodiment sets the apertures 230 having a certain size and calculates the intensity distribution in the same manner as the method according to the first exemplary embodiment. In addition, the distribution calculation unit 150 separately calculates the intensity distribution in the same manner as the method according to the third exemplary embodiment or the method according to the fourth exemplary embodiment.

A selection unit 160 sequentially selects the plurality of divided areas defined in the third or fourth exemplary embodiment and the peak area defined in the first exemplary embodiment as the evaluation area. The projection of the evaluation area is performed, and the determination of whether abnormal projection occurs is performed by a determination unit 170 in the same manner as the second to fourth exemplary embodiments.

Next, an operation and effect of the present exemplary embodiment will be described. In the present exemplary embodiment, the same operation and effect as the first to fourth exemplary embodiments can be obtained. In addition, the following operation and effect can be obtained.

Figure 13:
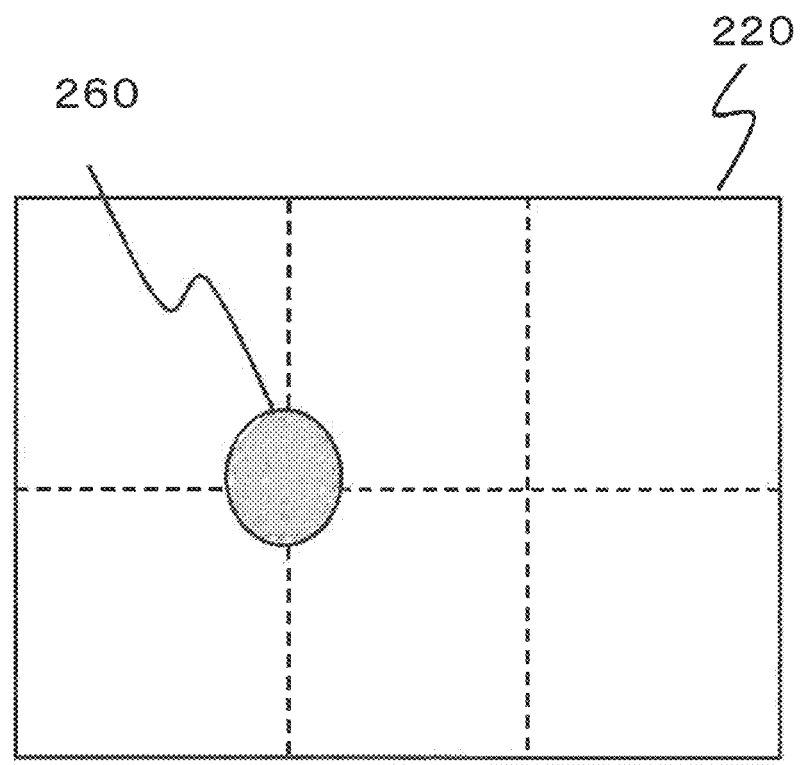
FIG. 13 is a diagram for describing an operation and effect of a fifth exemplary embodiment.

FIG. 13 is a diagram for describing the operation and effect of the present exemplary embodiment. The present drawing illustrates an example in which a peak area 260 of the intensity of the light is positioned over the plurality of divided areas. If only the divided areas are the evaluation area in this case, a single block may satisfy a condition of the standard value. On the other hand, the intensity of the peak area 260 may exceed the standard value. Since the plurality of divided areas and the peak area are sequentially selected as the evaluation area in the selection unit 160 according to the present exemplary embodiment, it is possible to detect abnormal output in which a light of unexpected intensity is projected, control the intensity of the projection light, and stop the projection also in such a case.

Heretofore, the exemplary embodiments of the present invention have been described with reference to the drawings, but these are examples of the present invention, and various configurations other than those above can be applied.

Hereinafter, examples of referential modes are supplementarily noted.

1. A projection device including:
    a laser light source that emits a light that is a laser light;
    a projection control unit that controls, on the basis of image information, intensity distribution of the light to be projected, thereby generating an image;
    a projection unit that projects the light controlled by the projection control unit;
    a measurement unit that measures intensity of the light projected from the projection unit;
    a distribution calculation unit that calculates, on the basis of the image information, intensity distribution of the light to be projected from the projection unit;
    a selection unit that selects a partial evaluation area of the image which is to be used for determination;
    a determination unit that determines, on the basis of both the light intensity distribution in the evaluation area, calculated by the distribution calculation unit and the light intensity in the evaluation area, measured by the measurement unit, whether abnormal projection has occurred; and
    an output control unit that controls, on the basis of a determination result of the determination unit, either the laser light source or the projection control unit.

2. The projection device according to 1, wherein
    the projection control unit controls, on the basis of information indicating the evaluation area, the intensity distribution of the light to be projected.

3. The projection device according to 1 or 2, wherein
    the selection unit selects, on the basis of the intensity distribution of the light calculated by the distribution calculation unit, the evaluation area.

4. The projection device according to any one of 1 to 3, wherein
    the selection unit uses an area including a peak point of the intensity distribution of the light calculated by the distribution calculation unit as a peak area, and selects the peak area as the evaluation area.

5. The projection device according to 1 or 2, wherein
    the distribution calculation unit divides the image into a plurality of divided areas, and
    the selection unit sequentially selects the divided areas as the evaluation area.

6. The projection device according to 5, wherein
    the distribution calculation unit generates the divided areas, on the basis of the image information, such that the intensity of the light at a boundary of the plurality of divided areas is smaller than an average value of the intensity of the light of the whole image.

7. The projection device according to 5 or 6, wherein
    the selection unit uses an area including a peak point of the intensity distribution of the light calculated by the distribution calculation unit as a peak area, and sequentially selects the plurality of divided areas and the peak area as the evaluation area.

8. The projection device according to any one of 1 to 7, wherein
    the projection control unit includes:
    a phase modulation type spatial modulation element that phase-modulates the light;
    a Fourier transform lens that Fourier-transforms the light phase-modulated by the phase modulation type spatial modulation element; and
    an imaging optical system that images the light,
    the measurement unit includes:
    a polarization maintaining element that is arranged in a light path of the light which has passed through the Fourier transform lens, and reflects a part of the light;
    a monitor element that measures the intensity of the light reflected by the polarization maintaining element; and
    an intensity calculation unit that calculates, on the basis of the intensity of the light measured by the monitor element, the intensity of the projected light, and
    the imaging optical system images the light which has passed through the polarization maintaining element.

9. A projection device control method for controlling a projection device including a laser light source that emits a light that is a laser light, a projection control unit that controls, on the basis of image information, intensity distribution of the light to be projected, thereby generating an image, and a projection unit that projects the light controlled by the projection control unit, including:
    calculating, on the basis of the image information, intensity distribution of the light to be projected from the projection device;
    selecting a partial evaluation area of the image to be projected, which is to be used for determination;
    measuring intensity of the light projected from the projection device;
    determining, on the basis of both the calculated light intensity distribution, in the evaluation area, and the measured light intensity, in the evaluation area, whether abnormal projection has occurred; and
    controlling, on the basis of a determination result, the intensity distribution of the light to be projected from the projection device.

10. The projection device control method according to 9, wherein
    the intensity distribution of the light to be projected is controlled on the basis of information indicating the evaluation area.

11. The projection device control method according to 9 or 10, wherein
    the evaluation area is selected on the basis of the calculated intensity distribution of the light.

12. The projection device control method according to any one of 9 to 11, wherein
    an area including a peak point of the calculated intensity distribution of the light is used as a peak area, and the peak area is selected as the evaluation area.

13. The projection device control method according to 9 or 10, wherein
    the image is divided into a plurality of divided areas, and
    the divided areas are sequentially selected as the evaluation area.

14. The projection device control method according to 13, wherein
    the divided areas are generated on the basis of the image information such that the intensity of the light at a boundary of the plurality of divided areas is smaller than an average value of the intensity of the light of the whole image.

15. The projection device control method according to 13 or 14, wherein
    an area including a peak point of the calculated intensity distribution of the light is used as a peak area, and the plurality of divided areas and the peak area are sequentially selected as the evaluation area.

16. A projection device control apparatus for controlling a projection device including a laser light source that emits a light that is a laser light, a projection control unit that controls, on the basis of image information, intensity distribution of the light to be projected, thereby generating an image, and a projection unit that projects the light controlled by the projection control unit, including:

a distribution calculation unit that calculates, on the basis of the image information of the image to be projected, intensity distribution of the light to be projected from the projection device;

a selection unit that selects a partial evaluation area of the image to be projected, which is to be used for determination;

a measurement unit that measures intensity of the light projected from the projection device;

a determination unit that determines, on the basis of both the light intensity distribution, in the evaluation area, calculated by the distribution calculation unit and the light intensity, in the evaluation area, measured by the measurement unit, whether abnormal projection has occurred; and an output control unit that controls, on the basis of a determination result of the determination unit, the intensity distribution of the light to be projected from the projection device.

17. The projection device control apparatus according to 16, wherein the selection unit transmits information indicating the evaluation area to the projection control unit, and the projection control unit selects, on the basis of the information indicating the evaluation area received from the selection unit, an area that should be projected from the image, and controls the intensity distribution of the light such that the selected area is projected.

18. The projection device control apparatus according to 16 or 17, wherein the selection unit selects, on the basis of the intensity distribution of the light calculated by the distribution calculation unit, the evaluation area.

19. The projection device control apparatus according to any one of 16 to 18, wherein the selection unit uses an area including a peak point of the intensity distribution of the light calculated by the distribution calculation unit as a peak area, and selects the peak area as the evaluation area.

20. The projection device control apparatus according to 16 or 17, wherein the distribution calculation unit divides the image into a plurality of divided areas, and the selection unit sequentially selects the divided areas as the evaluation area.

21. The projection device control apparatus according to 20, wherein the distribution calculation unit generates the divided areas, on the basis of the image information, such that the intensity of the light at a boundary of the plurality of divided areas is smaller than an average value of the intensity of the light of the whole image.

22. The projection device control apparatus according to 20 or 21, wherein the selection unit uses an area including a peak point of the intensity distribution of the light calculated by the distribution calculation unit as a peak area, and sequentially selects the plurality of divided areas and the peak area as the evaluation area.

23. The projection device control apparatus according to any one of 16 to 22, wherein the projection control unit of the projection device includes:

a phase modulation type spatial modulation element that phase-modulates the light;

a Fourier transform lens that Fourier-transforms the light phase-modulated by the phase modulation type spatial modulation element; and an imaging optical system that images the light, the measurement unit of the control apparatus includes:

a polarization maintaining element that is arranged in a light path of the light which has passed through the Fourier transform lens, and reflects a part of the light;

a monitor element that measures the intensity of the light reflected by the polarization maintaining element; and an intensity calculation unit that calculates, on the basis of the intensity of the light measured by the monitor element, the intensity of the projected light, and the imaging optical system of the projection device images the light which has passed through the polarization maintaining element.

24. A computer program for achieving a projection device control apparatus including a laser light source that emits a light that is a laser light, a projection control unit that controls, on the basis of image information, intensity distribution of the light to be projected, thereby generating an image, a projection unit that projects the light controlled by the projection control unit, and a measurement unit that measures intensity of the projected light, which makes a computer function as:

a distribution calculation means that calculates, on the basis of the image information of the image to be projected, intensity distribution of the light to be projected from the projection device;

a selection means that selects a partial evaluation area of the image to be projected, which is to be used for determination;

a determination means that determines, on the basis of both the light intensity distribution, in the evaluation area, calculated by the distribution calculation unit and the measured light intensity, in the evaluation area, whether abnormal projection has occurred; and an output control means that controls, on the basis of a determination result of the determination means, the intensity distribution of the light to be projected from the projection device.

25. The computer program according to 24, wherein the selection means transmits information indicating the evaluation area to the projection control unit, and the projection control unit selects, on the basis of the information indicating the evaluation area received from the selection means, an area that should be displayed from the image, and controls the intensity distribution of the light such that the selected area is projected.

26. The computer program according to 24 or 25, wherein the selection means selects, on the basis of the intensity distribution of the light calculated by the distribution calculation means, the evaluation area.

27. The computer program according to any one of 24 to 26, wherein the selection means uses an area including a peak point of the intensity distribution of the light calculated by the distribution calculation means as a peak area, and selects the peak area as the evaluation area.

28. The computer program according to 24 or 25, wherein
the distribution calculation means divides the image into
a plurality of divided areas, and
the selection means sequentially selects the divided areas
as the evaluation area.

29. The computer program according to 28, wherein
the distribution calculation means generates the divided
areas, on the basis of the image information, such that the
intensity of the light at a boundary of the plurality of divided
areas is smaller than an average value of the intensity of the
light of the whole image.

30. The computer program according to 28 or 29, wherein
the selection means uses an area including a peak point of
the intensity distribution of the light calculated by the
distribution calculation means as a peak area, and sequentially selects the plurality of divided areas and the peak area
as the evaluation area.

This application is based upon and claims the benefit of
priority from Japanese patent application No. 2013-182788,
filed on Sep. 4, 2013, the disclosure of which is incorporated
herein in its entirety by reference.

What is claimed is:

1. A projection device comprising:
    a laser light source that emits a light that is a laser light;
    a projection control unit that controls, on the basis of image information, intensity distribution of the light to be projected, thereby generating an image;
    a projection unit that projects the light controlled by the projection control unit;
    a measurement unit that measures intensity of the light projected from the projection unit;
    a distribution calculation unit that calculates, on the basis of the image information, intensity distribution of the light to be projected from the projection unit;
    a selection unit that selects a partial evaluation area of the image which is to be used for determination;
    a determination unit that determines, on the basis of both the light intensity distribution in the evaluation area, calculated by the distribution calculation unit and the light intensity in the evaluation area, measured by the measurement unit, whether abnormal projection has occurred; and
    an output control unit that controls, on the basis of a determination result of the determination unit, either the laser light source or the projection control unit.

2. The projection device according to claim 1, wherein
the projection control unit controls, on the basis of information indicating the evaluation area, the intensity distribution of the light to be projected.

3. The projection device according to claim 1, wherein
the selection unit selects, on the basis of the intensity distribution of the light calculated by the distribution calculation unit, the evaluation area.

4. The projection device according to claim 1, wherein
the selection unit uses an area including a peak point of the intensity distribution of the light calculated by the distribution calculation unit as a peak area, and selects the peak area as the evaluation area.

5. The projection device according to claim 1, wherein
the distribution calculation unit divides the image into a plurality of divided areas, and
the selection unit sequentially selects the divided areas as the evaluation area.

6. The projection device according to claim 5, wherein
the distribution calculation unit generates the divided areas, on the basis of the image information, such that the intensity of the light at a boundary of the plurality of divided areas is smaller than an average value of the intensity of the light of the whole image.

7. The projection device according to claim 5, wherein
the selection unit uses an area including a peak point of the intensity distribution of the light calculated by the distribution calculation unit as a peak area, and sequentially selects the plurality of divided areas and the peak area as the evaluation area.

8. A projection device control method for controlling a projection device comprising a laser light source that emits a light that is a laser light, a projection control unit that controls, on the basis of image information, intensity distribution of the light to be projected, thereby generating an image, and a projection unit that projects the light controlled by the projection control unit, the projection device control method comprising:
    calculating, on the basis of the image information, intensity distribution of the light to be projected from the projection device;
    selecting a partial evaluation area of the image to be projected, which is to be used for determination;
    measuring intensity of the light projected from the projection device;
    determining, on the basis of both the calculated light intensity distribution, in the evaluation area, and the measured light intensity, in the evaluation area, whether abnormal projection has occurred; and
    controlling, on the basis of a determination result, the intensity distribution of the light to be projected from the projection device.

9. The projection device control method according to claim 8, wherein
the intensity distribution of the light to be projected is controlled on the basis of information indicating the evaluation area.

10. The projection device control method according to claim 8, wherein
the evaluation area is selected on the basis of the calculated intensity distribution of the light.

11. The projection device control method according to claim 8, wherein
the image is divided into a plurality of divided areas, and the divided areas are sequentially selected as the evaluation area.

12. A projection device control apparatus for controlling a projection device comprising a laser light source that emits a light that is a laser light, a projection control unit that controls, on the basis of image information, intensity distribution of the light to be projected, thereby generating an image, and a projection unit that projects the light controlled by the projection control unit, the projection device control apparatus comprising:
    a distribution calculation unit that calculates, on the basis of the image information of the image to be projected, intensity distribution of the light to be projected from the projection device;
    a selection unit that selects a partial evaluation area of the image to be projected, which is to be used for determination;
    a measurement unit that measures intensity of the light projected from the projection device;
    a determination unit that determines, on the basis of both the light intensity distribution, in the evaluation area, calculated by the distribution calculation unit and the light intensity, in the evaluation area, measured by the measurement unit, whether abnormal projection has occurred; and an output control unit that controls, on the basis of a determination result of the determination unit, the intensity distribution of the light to be projected from the projection device.

13. The projection device control apparatus according to claim 12, wherein
the selection unit transmits information indicating the evaluation area to the projection control unit, and
the projection control unit selects, on the basis of the information indicating the evaluation area received from the selection unit, an area that should be projected from the image, and controls the intensity distribution of the light such that the selected area is projected.

14. The projection device control apparatus according to claim 12, wherein
the selection unit selects, on the basis of the intensity distribution of the light calculated by the distribution calculation unit, the evaluation area.

15. The projection device control apparatus according to claim 12, wherein
the distribution calculation unit divides the image into a plurality of divided areas, and
the selection unit sequentially selects the divided areas as the evaluation area.

16. A non-transitory computer readable medium storing a computer program for achieving a projection device control apparatus comprising a laser light source that emits a light that is a laser light, a projection control unit that controls, on the basis of image information, intensity distribution of the light to be projected, thereby generating an image, a projection unit that projects the light controlled by the projection control unit, and a measurement unit that measures intensity of the projected light, which makes a computer function as:
a distribution calculation means that calculates, on the basis of the image information of the image to be projected, intensity distribution of the light to be projected from the projection device;
a selection means that selects a partial evaluation area of the image to be projected, which is to be used for determination;
a determination means that determines, on the basis of both the light intensity distribution, in the evaluation area, calculated by the distribution calculation unit and the measured light intensity, in the evaluation area, whether abnormal projection has occurred; and
an output control means that controls, on the basis of a determination result of the determination means, the intensity distribution of the light to be projected from the projection device.

17. The non-transitory computer readable medium storing the computer program according to claim 16, wherein
the selection means transmits information indicating the evaluation area to the projection control unit, and
the projection control unit selects, on the basis of the information indicating the evaluation area received from the selection means, an area that should be displayed from the image, and controls the intensity distribution of the light such that the selected area is projected.

18. The non-transitory computer readable medium storing the computer program according to claim 16, wherein
the selection means selects, on the basis of the intensity distribution of the light calculated by the distribution calculation means, the evaluation area.

19. The non-transitory computer readable medium storing the computer program according to claim 16, wherein
the distribution calculation means divides the image into a plurality of divided areas, and
the selection means sequentially selects the divided areas as the evaluation area.

* * * * *